US009890061B2

(12) United States Patent
Richardson et al.

(10) Patent No.: US 9,890,061 B2
(45) Date of Patent: Feb. 13, 2018

(54) COMPOSITIONS AND METHODS FOR SELECTIVE ANION REMOVAL

(71) Applicant: CHEMTREAT, INC., Glen Allen, VA (US)

(72) Inventors: John Richardson, Hanover, VA (US); Vladimir Djukanovic, Glen Allen, VA (US); William Henderson, Ashland, VA (US)

(73) Assignee: CHEMTREAT, INC., Glen Allen, VA (US)

(*) Notice: Subject to any disclaimer, the term of this patent is extended or adjusted under 35 U.S.C. 154(b) by 45 days.

(21) Appl. No.: 14/874,944

(22) Filed: Oct. 5, 2015

(65) Prior Publication Data
US 2016/0096747 A1 Apr. 7, 2016

Related U.S. Application Data

(60) Provisional application No. 62/059,314, filed on Oct. 3, 2014.

(51) Int. Cl.
| C02F 1/28 | (2006.01) |
| B01J 20/02 | (2006.01) |
| B01J 20/30 | (2006.01) |
| B01J 20/12 | (2006.01) |
| C02F 101/10 | (2006.01) |
| C02F 1/00 | (2006.01) |
| C02F 1/24 | (2006.01) |
| C02F 1/38 | (2006.01) |
| C02F 1/42 | (2006.01) |
| C02F 1/44 | (2006.01) |
| C02F 1/52 | (2006.01) |
| C02F 1/66 | (2006.01) |
| C02F 1/68 | (2006.01) |
| C02F 1/72 | (2006.01) |
| C02F 101/14 | (2006.01) |
| C02F 101/22 | (2006.01) |
| C02F 101/36 | (2006.01) |

(52) U.S. Cl.
CPC .......... *C02F 1/288* (2013.01); *B01J 20/0207* (2013.01); *B01J 20/12* (2013.01); *B01J 20/30* (2013.01); *C02F 1/281* (2013.01); *C02F 1/004* (2013.01); *C02F 1/24* (2013.01); *C02F 1/38* (2013.01); *C02F 1/42* (2013.01); *C02F 1/44* (2013.01); *C02F 1/52* (2013.01); *C02F 1/66* (2013.01); *C02F 1/683* (2013.01); *C02F 1/72* (2013.01); *C02F 2001/425* (2013.01); *C02F 2101/103* (2013.01); *C02F 2101/105* (2013.01); *C02F 2101/14* (2013.01); *C02F 2101/22* (2013.01); *C02F 2101/36* (2013.01); *C02F 2209/18* (2013.01); *C02F 2303/16* (2013.01)

(58) Field of Classification Search
USPC ................... 210/287, 662, 673, 679
See application file for complete search history.

(56) References Cited

U.S. PATENT DOCUMENTS

| 5,997,829 A | 12/1999 | Sekine et al. |
| 2010/0230359 A1 | 9/2010 | Whitehead et al. |
| 2011/0303871 A1 | 12/2011 | Burba et al. |
| 2012/0261611 A1 | 10/2012 | Hassler et al. |

FOREIGN PATENT DOCUMENTS

| EP | 1012123 A1 | 6/2000 |
| WO | 2014094046 A1 | 6/2014 |

OTHER PUBLICATIONS

Oct. 4, 2016 Notification of Transmittal of International Preliminary Report on Patentability issued in International Application No. PCT/US15/54029.

Dec. 22, 2015 International Search Report issued in PCT/US2015/054029.

Dec. 22, 2015 Written Opinion issued in International Application No. PCT/US2015/054029.

*Primary Examiner* — Dirk Bass
(74) *Attorney, Agent, or Firm* — Oliff Attorneys at Law

(57) ABSTRACT

Methods for removing a target anion entity, such as a phosphate ion, from fluids by treating the fluid with a substrate containing an immobilized rare earth, the substrate being either a first loaded substrate including a first immobilized cationic rare earth, the first loaded substrate being formed by precipitating a rare earth in a clay such that the rare earth is fixed inside a porous structure of the clay and/or fixed on the surface of the clay; or a second loaded substrate comprising a second immobilized cationic rare earth that is bonded to the second loaded substrate via a chelating ligand.

45 Claims, 3 Drawing Sheets

COMPOSITIONS AND METHODS FOR SELECTIVE ANION REMOVAL

CROSS-REFERENCE TO RELATED APPLICATION

This nonprovisional application claims the benefit of U.S. Provisional Application No. 62/059,314 filed Oct. 3, 2014. The disclosure of the prior application is hereby incorporated by reference in its entirety.

BACKGROUND

The purification and filtration of water and other aqueous solutions is necessary for many applications, such as the treatment of feeds, waste streams, process streams and by-products associated with various industrial processes, the provision of safe portable drinking water, and the treatment and control of municipal waste water. Known methods for purifying aqueous solutions include reverse osmosis, distillation, ion-exchange, chemical adsorption, coagulation, flocculation, and filtering or retention. Many of these purification practices can be costly, energy inefficient and require significant technical know-how and sophistication to implement on both large and small scales. As a result, many advanced fluid purification technologies have had limited application.

There remains a need for improved removal methods (in terms of, for example, efficiency and selectivity) for removing anions, such as phosphate, from water. The improved methods would desirably contain an active composition stable to decomposition (i.e., a composition that neither bleeds into surrounding water, nor decomposes to form a harmful substance). The disclosure that follows describes such methods and compositions for removing anions, such as phosphate, from water.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some embodiments, the present disclosure relates to methods for removing one or more target anionic entities from a fluid, including contacting a fluid comprising a target anionic entity with at least one substrate selected from the group consisting of: a clay substrate including a clay with a cationic rare earth that is precipitated in the clay so that the cationic rare earth is fixed or trapped inside a porous structure of the clay and/or fixed on a surface of the clay, and a ligand bonded substrate including a cationic rare earth that is bonded to the ligand bonded substrate via a chelating ligand, to remove at least a portion of the target anionic entity from the fluid to form a treated fluid.

In some embodiments, the present disclosure relates to an apparatus for removing one or more target anionic entities from a fluid, the apparatus including a container; and a clay support medium provided in the container, the clay support medium including a clay, and the clay support medium being loaded with an immobilized cationic rare earth that is precipitated inside a porous structure of the clay and/or on a surface of the clay.

In some embodiments, the present disclosure relates to an apparatus for removing one or more target anionic entities from a fluid, the apparatus including a container; and a support medium provided in the container, the support medium being loaded with an immobilized cationic rare earth that is bonded to the support medium via a chelating ligand.

In some embodiments, the present disclosure relates to methods for preparing a substrate for removing one or more target anionic entities from a fluid, including providing a solution including a rare earth salt; combining the solution with a clay so that the rare earth salt is absorbed within the clay; and then contacting the clay with a base to precipitate a rare earth of the rare earth salt in the clay such that the rare earth is fixed or trapped inside a porous structure of the clay and/or fixed on a surface of the clay.

In some embodiments, the present disclosure relates to methods for removing one or more target anionic entities from a fluid, including contacting a fluid comprising a target anionic entity with at least one substrate selected from the group consisting of: a porous substrate including a cationic rare earth that is precipitated in the substrate so that the cationic rare earth is fixed or trapped inside a porous structure of the substrate and/or fixed on a surface of the porous substrate, and a porous substrate including a cationic rare earth that is bonded to the porous substrate via a chelating ligand, to remove at least a portion of the target anionic entity from the fluid to form a treated fluid.

BRIEF DESCRIPTION OF THE DRAWINGS

The manner in which the objectives of the present disclosure and other desirable characteristics may be obtained is explained in the following description and attached drawings in which.

DETAILED DESCRIPTION

Figure 1:
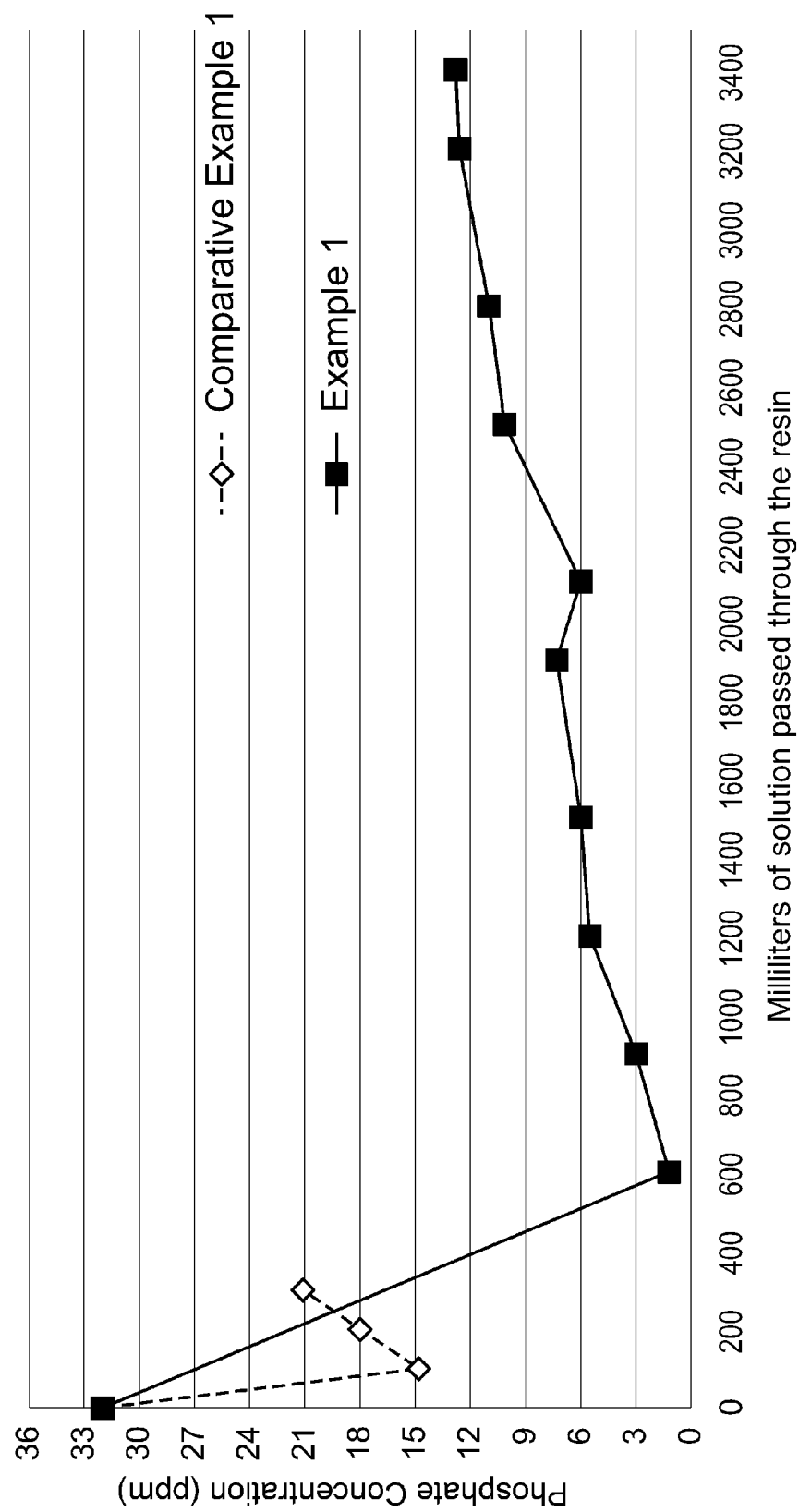
FIG. 1 is an illustration of the breakthrough curve profiles of the resin of Comparative Example 1.

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation-specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. The term "about" should be understood as any amount or range within 10% of the recited amount or range (for example, a range from about 1 to about 10 encompasses a range from 0.9 to 11). Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that any conceivable data point within the range is to be considered to have been specified, and (ii) that the inventors possessed knowledge of the entire range, each conceivable sub-range within the range, and each conceivable point within the range. Furthermore, the subject matter of this application illustratively disclosed herein suitably may be practiced in the absence of any element(s) that are not specifically disclosed herein.

The methods, compositions, and systems of the present disclosure generally relate to removing a target anionic entity (for example, a phosphate, an arsenate, a chromate, a fluoride and/or a perchlorate), from fluids (such as water) that are relatively rich in the target anionic entity via a reaction with a cationic entity to form an insoluble target-loaded material that may be further processed in any desired manner. In some embodiments, the methods, compositions and systems of the present disclosure may be used for generating useful products, such as fertilizer and/or specialty chemicals, from the fluid to be treated, such as a low value or waste feed stream. For example, in embodiments where the insoluble target-loaded material comprises a reaction product of phosphate, the insoluble target-loaded material may be further processed, such as via one or more further reactions and/or process steps, to generate a fertilizer (e.g., an ammonium phosphate nutrient solution) and/or a specialty chemical (e.g., a phosphoric acid solution, which, for example, may be used for an e-coat application).

Prior to describing the various embodiments, the following definitions are provided and should be used unless otherwise indicated.

Definitions

The term "target anionic entity" refers to an anion that is to be selectively removed from a fluid, such as water. In some embodiments, the target anionic entity may be selected from the group consisting of a phosphate, an arsenate, a chromate, a fluoride, a perchlorate, a phosphorus-containing anion, an arsenic-containing anion, a fluorine-containing anion, and a chromium-containing anion.

The term "fluid" refers to any water-containing liquid. The fluid may be relatively rich in a target anionic entity. The fluid can be any fluid stream comprising one or more target anionic entities and may be derived from any source. Examples of suitable fluids that may be relatively rich in one or more target anionic entities are recreational waters, municipal waters (such as, sewage, waste, agricultural, or ground waters), industrial (such as cooling, boiler, or process waters), wastewaters, well waters, septic waters, drinking waters, naturally occurring waters, (such as a lake, pond, reservoir, river, or stream), and other waters and/or aqueous process streams.

Examples of recreational waters are swimming pool waters, brine pool waters, therapy pool waters, diving pool waters, sauna waters, spa waters, and hot tub waters. Examples of municipal waters are drinking waters, waters for irrigation, well waters, waters for agricultural use, waters for architectural use, reflective pool waters, water-fountain waters, water-wall waters, use, non-potable waters for municipal use and other non-potable municipal waters. Wastewaters may include municipal and/or agricultural run-off waters, septic waters, waters formed and/or generated during an industrial and/or manufacturing process, waters formed and/or generated by a medical facility, waters associated with mining, mineral production, recovery and/or processing (including petroleum), evaporation pound waters, and non-potable disposal waters. Well waters may include waters produced from a subsurface well for the purpose of human consumption, agricultural use (including consumption by an animal, irrigation of crops or consumption by domesticated farm animals), mineral-containing waters, waters associated with mining and petroleum production. Examples of naturally occurring waters include associated with rains, storms, streams, rivers, lakes, aquifers, estuaries, lagoons, and such.

The term "water" refers to any aqueous composition. The water may be relatively rich in a target anionic entity, such as an aqueous composition that originates and/or is derived from a natural and/or industrial source. Water sources may include aqueous streams, drinking waters, potable waters, recreational waters, waters derived from manufacturing processes, wastewaters, pool waters, spa waters, cooling waters, boiler waters, process waters, municipal waters, sewage waters, agricultural waters, ground waters, power plant waters, remediation waters, co-mingled water and combinations thereof.

The term "soluble" refers to an ion/compound/material/composition (hereinafter collectively referred to as a "material") that readily dissolves in a fluid/solvent, such as water. For the material to be considered to be soluble, the material may have a solubility in the fluid/solvent such that about 5 grams of the material will dissolve in about one liter of the fluid/solvent (in less than 2 minutes under predetermined conditions, such as ambient conditions) and be stable in the fluid/solvent. Substantially soluble materials are capable of dissolution on a time scale of minutes rather than days, with little undissolved mass remaining after 2 minutes, e.g., less than about 1% mass of the material remaining after 2 minutes of exposure to a fluid/solvent, such as water, or less than about 0.1% mass of the material remaining after 2 minutes of exposure to a fluid/solvent, such as water.

The term "insoluble" refers to materials that remain as solids in a fluid/solvent, such as water. Insoluble materials are able to be retained in a device, such as a bed (e.g., a packed-bed, fixed-bed or fluidized bed) and/or column, or be readily recovered from a reaction using physical means, such as filtration. Substantially insoluble materials are capable of prolonged exposure to a fluid/solvent, such as water, over weeks or months, with little loss of mass in the form of dissolved materials, e.g., less than about 2% mass loss of the insoluble material after a prolonged exposure to a fluid/solvent, such as water (over weeks or months), or less than about 0.1% mass loss of the insoluble material after a prolonged exposure to a fluid/solvent, such as water (over weeks or months).

"Precipitating" and "precipitation" refer to the transformation of a dissolved material, such as a dissolved target anionic entity (e.g., a phosphate ion) or a dissolved rare earth salt (e.g., cerium (III) chloride ($CeCl_3$)), to an insoluble material.

The term "rare earth" refers to one or more element selected from yttrium, scandium, lanthanum, cerium, praseodymium, neodymium, samarium, europium, gadolinium, terbium, dysprosium, holmium, erbium, thulium, ytterbium, and lutetium. In the present disclosure, lanthanum, cerium, praseodymium, neodymium, samarium, europium, gadolinium, terbium, dysprosium, holmium, erbium, thulium, ytterbium, and lutetium may also be referred to as "lanthanoids." The rare earth can be a mixture of different rare earth elements, such as two or more of yttrium, scandium, lanthanum, cerium, praseodymium, neodymium, samarium, europium, gadolinium, terbium, dysprosium, holmium erbium, thulium, ytterbium, and lutetium; or, in some embodiments, two or more of yttrium, scandium, cerium, lanthanum, praseodymium, and neodymium. Any suitable rare earth ions, such as trivalent, tetravalent, or pentavalent cations, may be used in the methods, compositions and systems of the present disclosure. The rare earth ions used in the methods, compositions and systems of the present disclosure are generally of a cationic form, and may be of the same or different valence and/or oxidation states and/or numbers.

"Phosphorus-containing anion" or "phosphate" refers, for example, to compounds formed from a $PO_4^{3-}$ (phosphate), or a related anion or group, such as $OPO(OH)_2$, structural unit alone or linked together by sharing oxygen atoms to form a linear chain or cyclic ring structure. Examples of phosphorus-containing compounds may include: salts or esters of phosphoric acid or a tertiary salt of orthophosphoric acid; orthophosphates (present as $H_3PO_4$, $H_2PO_4^-$, $HPO_4^{2-}$, $PO_4^{3-}$, and complexes thereof); pyrophosphate (present as $H_4P_2O_7$, $H_3P_2O_7^-$, $H_2P_2O_7^{2-}$, $HP_2O_7^{3-}$, $P_2O_7^{4-}$, and complexes thereof); tripolyphosphate (present as $H_3P_3O_{10}^{2-}$, $H_2P_3O_{10}^{3-}$, $HP_3O_{10}^{4-}$, $P_3O_{10}^{5-}$, and complexes thereof); trimetaphosphate (present as $HP_3O_9^{2-}$ and $P_3O_9^{3-}$); and organic phosphates (such as phospholipids; sugar phosphates; nucleotides; and phosphoamides).

As used herein, the term "triggering event" refers to any action that is sufficient to initiate the precipitation of a component of a solution, such as a reaction product of the target anionic entity and an immobilized cationic entity.

The term "surface area" refers to surface area of a material and/or substance determined by any suitable surface area measurement method. Preferably, the surface area is determined by any suitable Brunauer-Emmett-Teller (BET) analysis technique for determining the specific area of a material and/or substance.

The term "chelating resin" refers, for example, to a compound or polymer having one or more chelating ligands.

The term "uptake" refers, for example, to a process resulting in the association and/or immobilization of a rare earth with a surface and/or the interior of the substrate, such as, for example, with one or more chelating groups on the surface of the substrate.

The terms "immobilize" or "immobilization" refers to the capture or attachment (such as via a chemical bond and/or via physical entrapment) of a rare earth on, or in the porous interior of, a substrate, such a surface of an insoluble substrate, that occurs in such a manner to leave at least a portion of the rare earth in a state that it is capable of interacting and/or reacting with a target anionic entity. In embodiments relating to the first immobilized cationic entity, this may include a precipitated rare earth that is physically fixed within the pores of a substrate, such as clay.

Embodiments

In embodiments, the present disclosure relates to methods, compositions, and systems for removing a target anionic entity, from fluids, such as water, relatively rich in the target anionic entity (i.e., fluids in which the target anionic entity is present in amounts to the extent that it would be beneficial to remove the target anionic entity, for example, such as where at least 2 ppm of a target anionic entity dissolved within the fluid, or at least 5 ppm of a target anionic entity dissolved within the fluid, or at least 10 ppm of a target anionic entity dissolved within the fluid, or fluids saturated with the target anionic entity; in some embodiments, the fluids to be treated by the methods of the present disclosure (from which the target anionic entity is to be removed) may contain from about 2 ppm to about 50,000 ppm of a target anionic entity dissolved within the fluid, such as from about 5 ppm to about 5,000 ppm of a target anionic entity dissolved within the fluid, or from about 10 ppm to about 500 ppm, or from about 10 ppm to about 50 ppm of a target anionic entity dissolved within the fluid).

The target anionic entity may be removed by contacting a fluid comprising the target anionic entity with a substrate comprising an immobilized cationic rare earth to form a treated fluid, where substrate and the immobilized cationic rare earth may be present in an amount effective to remove a predetermined amount of target anionic entity from the fluid. The effective amount of substrate and the immobilized cationic rare earth may depend on a number of factors, such as, for example, the particular immobilized cationic rare earth, the rare earth loading capacity of the substrate, and the desired amount of target anionic entity to be removed. In embodiments, the immobilized cationic rare earth (i) may be a first immobilized cationic rare earth that is precipitated in a manner such that the precipitated form of the rare earth is fixed inside the porous structure of the substrate and/or fixed on the surface of the substrate (i.e., the first loaded substrate), (ii) may be a second immobilized cationic rare earth that is bonded to the substrate (i.e., the second loaded substrate) via a chelating ligand, or (iii) may include both a first immobilized cationic rare earth and a second immobilized cationic rare earth.

While the discussion below identifies clay as the particular first loaded substrate being modified and loaded with rare earth, other substrate materials, such as, for example, substrates having similar functional groups (for example, similar to the functional groups of sepiolite) and adequate structural integrity such that the substrate (i.e., the first loaded substrate) will not significantly swell, expand, disperse, or disintegrate upon exposure to an aqueous fluid and/or water may also be used. Such substrates may include, for example, zeolites, ceramics, carbonaceous materials, resins, polymers and the like, which may be functionalized, as desired, with suitable functional groups, for example, similar to those of sepiolite.

Clay Substrate with Immobilized Cationic Rare Earth

In some embodiments, the methods, compositions and systems of the present disclosure may include a first loaded substrate, such as a clay (for example, sepiolite, attapulgite, or palygorskite) that is able to maintain its structural integrity (e.g., not significantly swell, expand, disperse, or disintegrate) upon exposure to an aqueous composition, and capable of physically and/or chemically immobilizing a form of a rare earth. In some embodiments, the first loaded substrate, such as a clay, may not swell to a size greater than about 1.25 times initial size (by volume) upon exposure to an aqueous composition, or may not swell to a size greater than about 1.1 times initial size (by volume) upon exposure to an aqueous composition, or may not swell to a size greater than about 1.05 times initial size (by volume) upon exposure to an aqueous composition. In some embodiments, the first loaded substrate, such as a clay, upon exposure to an aqueous composition may not swell upon exposure to an aqueous composition, or may only swell to a volume that is 1.01 to 1.05 times that of the first loaded substrate, such as a clay, before exposure to an aqueous composition.

For example, a precipitated form of the rare earth may be immobilized in the first loaded substrate in a manner such that it is fixed/entrapped inside/on the surface of the clay such that a form of the rare earth is available to react with and precipitate (and/or hold) a target anionic entity (thereby removing it from the fluid being treated) and form an insoluble target-loaded material that may be further processed (such as by filtering and/or a further reaction).

In some embodiments, the first immobilized cationic rare earth may be prepared by any suitable methodology that involves the mixing solution of a rare earth salt (such as a saturated solution of the rare earth salt, or a slurry of the rare earth salt) with clay (such as, for example, sepiolite), in any suitable weight ratio of clay to rare earth salt such that an excess of rare earth is available to be introduced into the clay.

For example, suitable rare earth salts for preparing the first loaded substrate include, for example, cerium (III) salts (such as cerous chloride, cerous bromide, cerous iodide, cerous sulfate, cerous nitrate, cerous chlorate, and cerous oxalate), ceric (IV) salts (such as ceric chloride, ceric bromide, ceric iodide, ceric sulfate, ceric nitrate, ceric chlorate, and ceric oxalate), lanthanum (III) salts (such as lanthanum chloride, lanthanum bromide, lanthanum iodide, lanthanum chlorate, lanthanum sulfate, lanthanum oxalate, and lanthanum nitrate), and mixtures thereof. Known salts of the other rare earths may also be used to generate the respective first loaded substrate.

In some embodiments, the first loaded substrate may be a cerium loaded substrate, which, in addition to cerium, comprises one or more other water-soluble rare earths at any desired molar ratio to the cerium. The rare earth elements other than cerium may include yttrium, scandium, lanthanum, praseodymium, neodymium, samarium, europium, gadolinium, terbium, dysprosium, holmium, erbium, thulium, ytterbium, and lutetium. For example, the first loaded substrate comprising cerium may contain cerium and one or more other water-soluble rare earth (such as, for example, one or more of lanthanum, neodymium, praseodymium and samarium). The molar ratio of cerium to the other rare earth may be from about 1:1 to about 50:1, or from about 5:1 to about 40:1, or about 15:1 to about 30:1.

In some embodiments, the clay and rare earth salt (such as a saturated solution of the rare earth salt, or a slurry of the rare earth salt) may be allowed to mix/combine in a known vessel or known apparatus for a predetermined amount of time, such as a mixing period sufficient to ensure rare earth salt is fully absorbed into the clay (such as, for example, sepiolite). In some embodiments, after the rare earth salt is fully absorbed into the clay (such as, for example, sepiolite), a first immobilized cationic rare earth may be formed in the clay by precipitating the rare earth. Precipitation may be triggered by introducing a base into the mixture.

In some embodiments, a precipitated form of the rare earth may be fixed (i.e., immobilized) inside and/or on the surface of the clay upon initiation of a triggering event brought about by a predetermined condition, such as the presence of a base, such as NaOH, at a pH of about 10 or more, such as a pH of about 11 or more, or a pH of about 12 or more. In some embodiments, once the base is added to the mixture and the rare earth, such as, for example, cerium, is precipitated inside and/or on the surface of the clay to form a first immobilized cationic rare earth, the clay comprising the first immobilized cationic rare earth may be washed, while maintaining the precipitated rare earth in an immobilized state. For example, in some embodiments, the clay comprising the first immobilized cationic rare earth may be washed with deionized water until the pH returns to a pH in the range of from about 6.5 to about 8.5, such as a pH in the range of from about 7 to about 8, or a neutral pH (e.g., a pH of 7).

In some embodiments, at various time during the methods of the present disclosure the first loaded substrate may comprise a mixture of rare earths with multiple naturally occurring oxidation states, such as two or more oxidation states, for example, such as a +3 and a +4 oxidation state for one or more of the rare earths, such as cerium. In some embodiments, the cationic rare earth of the at least one substrate may only be present in a single naturally occurring oxidation state.

For example, in some embodiments, for example, when the rare earth is cerium obtained from a cerium (III) salt, before the cerium is precipitated in a clay so that the clay includes the first immobilized cationic rare earth, the majority of the rare earth (e.g., cerium) may have a +3 oxidation state (i.e., before being precipitated/loaded onto the substrate to form the first loaded substrate), for example, at least about 75 wt % of the rare earth has a +3 oxidation state, such as at least about 95 wt % of the rare earth has a +3 oxidation state, or at least about 99.9 wt % of the rare earth has a +3 oxidation state. In some embodiments, precipitation of the rare earth (e.g., cerium) or a form thereof inside and/or on the surface of the clay (such as in the form of an oxide, hydroxide and/or other complexed rare earth material) to form the first immobilized cationic rare earth converts a portion of the rare earth (e.g., cerium) having a +3 oxidation state to a +4 oxidation state, for example, at least about 40 wt % of the rare earth that had a +3 oxidation state may be converted to a +4 oxidation state, such as at least about 60 wt % of the rare earth that had a +3 oxidation state may be converted to a +4 oxidation state, or at least about 80 wt % of the rare earth that had a +3 oxidation state may be converted to a +4 oxidation state, or at least about 95 wt % of the rare earth that had a +3 oxidation state may be converted to a +4 oxidation state.

In some embodiments, the washed clay comprising the first immobilized cationic rare earth may then be dried, such as at room temp, or dried in an oven, such as at a temperature in the range of from about 30° C. to about 100° C. In some embodiments, the clay comprising the first immobilized cationic rare earth may be processed to be dry (such as at a moisture content in the range of from about 0.1 weight % to about 4 weight percent) or semi-dry (such as at a moisture content in the range of from about 4 weight percent to about 20 weight percent) before it is used, for example, to remove the target anionic entity (or reaction product thereof) from a fluid containing the target anionic entity, such as a fluid containing least 2 ppm of a target anionic entity dissolved within the fluid, or at least 5 ppm of a target anionic entity dissolved within the fluid, or at least 10 ppm of a target anionic entity dissolved within the fluid. In some embodiments, the dry or semi-dry clay comprising the first immobilized cationic rare earth may be packed into columns, cartridges, canisters, multimedia filters, geo-bags, or any kind of container or containment that will allow for a flow of water across the surface of clay.

In some embodiments, after clay comprising the first immobilized cationic rare earth is formed, the clay comprising the first immobilized cationic rare earth may be used to remove a target anionic entity form a fluid such that the clay becomes loaded with at least some of the target anionic entity (or loaded to a maximum capacity of the target anionic entity, such as a phosphorus containing target anionic entity). In such embodiments, for example, when the rare earth is cerium, before the target anionic entity, such as a phosphorus containing target anionic entity, interacts (e.g., reacts/precipitates) with the clay comprising the first immobilized cationic rare earth to form a clay loaded with at least some of the target anionic entity, a portion or a majority of the rare earth (e.g., cerium) may have a +4 oxidation state (before being reacted/precipitated/loaded with the target anionic entity), for example, at least about 40 wt % of the rare earth (in the clay comprising the first immobilized cationic rare earth) may have a +4 oxidation state, such as at least about 60 wt % of the rare earth may have a +4 oxidation state, or at least about 80 wt % of the rare earth may have a +4 oxidation state, or at least about 95 wt % of the rare earth may have a +4 oxidation state. In some embodiments, the interaction (e.g., reaction/precipitation/loading) that occurs between the target anionic entity the clay forms a clay loaded with the target anionic entity and converts the rare earth (e.g., cerium) into a material in which the oxidation state of at least a portion of the rare earth (that has an +4 oxidation state) is reduced from a +4 oxidation state to a +3 oxidation state. In some embodiments, for example, at least about 30 wt % of the rare earth (initially present in the clay comprising the first immobilized cationic rare earth before the reaction with the target ionic entity) that had a +4 oxidation state may be converted to a +3 oxidation state, such as at least about 50 wt % of the rare earth that had a +4 oxidation state may be converted to a +3 oxidation state, or at least about 70 wt % of the rare earth that had a +4 oxidation state may be converted to a +3 oxidation state, or at least about 90 wt % of the rare earth that had a +4 oxidation state may be converted to a +3 oxidation state, or at least about 95 wt % of the rare earth that had a +4 oxidation state may be converted to a +3 oxidation state.

Thereafter, the clay may be regenerated, recycled, removed and/or disposed of. For example, in embodiments in which the clay loaded with the target anionic entity (such as a phosphorus containing target anionic entity) may be regenerated and reused, the exhausted clay (i.e., clay loaded with the target anionic entity, such as a phosphorus containing target anionic entity) may be treated with an appropriate reagent, such as a base (e.g., a strong base), like an aqueous NaOH wash (e.g., a NaOH wash that includes an amount of NaOH in a range of from about 0.1 to about 4% by weight of a base, such as, for example, NaOH, such as an amount of NaOH in a range of from about 0.3 to about 2% by weight NaOH, or an amount of NaOH in a range of from about 0.5 to about 1% by weight NaOH), to regenerate the exhausted clay via releasing the target anionic entity or a form thereof (such as sodium phosphate), which returns the clay to a form (i.e., a clay comprising the first immobilized cationic rare earth) in which it is ready to capture further target anionic entity (e.g., phosphate). In such embodiments, for example, when the rare earth is cerium, before regeneration process is initiated, a portion or a majority of the rare earth (e.g., cerium) in the material comprising the target anionic entity may have a +3 oxidation state (before being regenerated with an appropriate reagent, such as an aqueous NaOH wash), for example, at least about 20 wt % of the rare earth (in the clay material comprising the target anionic entity) may have a +3 oxidation state, such as at least about 40 wt % of the rare earth may have a +3 oxidation state, or at least about 60 wt % of the rare earth may have a +3 oxidation state, or at least about 80 wt % of the rare earth may have a +3 oxidation state, or at least about 95 wt % of the rare earth may have a +3 oxidation state. In some embodiments, the regeneration process converts the rare earth (e.g., cerium) into a reusable clay comprising the first immobilized cationic rare earth (i.e., capable of removing further target anionic entities) in which the oxidation state of at least a portion of the rare earth is converted from a +3 oxidation state to a +4 oxidation state. In some embodiments, for example, at least about 30 wt % of the rare earth that had a +3 oxidation state is converted to a +4 oxidation state during the regeneration process, such as at least about 50 wt % of the rare earth that had a +3 oxidation state is converted to a +4 oxidation state during the regeneration process, or at least about 70 wt % of the rare earth that had a +3 oxidation state is converted to a +4 oxidation state during the regeneration process, or at least about 80 wt % of the rare earth that had a +3 oxidation state is converted to a +4 oxidation state during the regeneration process, or at least about 90 wt % of the rare earth that had a +3 oxidation state is converted to a +4 oxidation state during the regeneration process, or at least about 95 wt % of the rare earth that had a +3 oxidation state is converted to a +4 oxidation state during the regeneration process.

In some embodiments, less than about 0.5% mass loss (or less than about 0.01% mass loss) of the precipitated rare earth (based on the entire mass of the precipitated rare earth in first loaded substrate) may occur after a prolonged exposure to a fluid/solvent, such as an aqueous fluid (with a pH in the range of from about 5.0 to about 9, or a pH in the range of from about 6.0 to about 8, or pH in the range of from about 6.5 to about 7.5, or a neutral pH (e.g., a pH of 7) relatively rich in the target anionic entity} in an aqueous media within the timeframe for removing a target anionic entity (such as during the course of a treatment operation, or over multiple hours, multiple days, or multiple weeks), from fluids, such as water, relatively rich in the target anionic entity (i.e., fluids in which the target anionic entity is present in amounts to the extent that it would be beneficial to remove the target anionic entity, such as at least 2 ppm of a target anionic entity dissolved within the fluid, at least 5 ppm of a target anionic entity dissolved within the fluid, or at least 10 ppm of a target anionic entity dissolved within the fluid). Unless otherwise indicated the percent mass loss is based on an assessment (via a known analytical technique, such as a X-ray fluorescence (XRF) spectrometry analysis) of the mass of the rare earth alone (e.g., if the rare earth was cerium, a 0.01% mass loss would imply that 0.01% of the elemental cerium had been lost based on the entire mass of the precipitated rare earth in first loaded substrate).

In some embodiments, the rare earth may persist on the surface and/or the interior of the first loaded substrate that is in contact with a fluid in which the target anionic entity is present and exhibit either no bleed (no mass loss of the rare earth) or a very slow bleed with less than about 0.5% mass loss, or less than about 0.01% mass loss of the rare earth (based on the entire mass of the precipitated rare earth in first loaded substrate) during the course of a treatment operation that removes a target anionic entity from a fluid, or over multiple hours, multiple days, or multiple weeks.

The clay comprising the first immobilized cationic rare earth may be comprised in a known vessel or known apparatus, and/or may be in any suitable form, such as, for example, a shaped clay substrate of any desirable shape, or a particulate clay substrate dispersed in a liquid formulation. The clay substrate can be supported or unsupported.

In some embodiments, the clay may comprise one or more different clays having the above describe properties. One or more rare earths may be comprised on (or in a porous interior of) the substrate may be entrapped inside and on the surface of the clay.

In some embodiments, the substrate (such as clay) may be porous; e.g., the substrate may be selected/prepared to have any desired pore size, such as an average pore size is in a range of from about 10 nm to about 10 µm, or an average pore size in a range of from about 100 nm to about 5,000 nm, or an average pore size in a range of from about 200 nm to about 2,000 nm.

In some embodiments, the porous substrate suitable for use as the first loaded substrate in the methods, compositions, and systems of the disclosure may comprise one or more of the following characteristics: a surface area (Langmuir surface area) greater than about 1 $m^2/g$; a surface area of from about 1 to about 200 $m^2/g$, or a surface area of from about 5 to about 150 $m^2/g$, or surface area of from about 10 to about 100 $m^2/g$.

In embodiments, the substrate (such as clay) may possess a thermal stability range (in which it will not decompose, or less than 1% by mass deterioration or decomposition, such as less than 0.5% by mass deterioration or decomposition) of at least 10° C. higher than the highest temperature that is observed in the fluid (e.g., water containing the target anionic entity) being treated, such as a thermal stability range of at least up to 100° C., or a thermal stability range of greater than about −5° C. to about 100° C.

In embodiments, the substrate (such as clay) stability (in which it will not decompose, or less than 1% by mass deterioration or decomposition, such as less than 0.5% by mass deterioration or decomposition) that is sufficient to survive the chemical environment of the water being treated (e.g., the additional chemicals comprised in the aqueous composition being treated) for periods greater than 6 hours, such as periods greater than about 6 hours to about one week.

In embodiments, the clay comprising the first immobilized cationic rare earth may possess a wide pH stability range, such as a pH stability range in the range of from a pH of about 4 to about 12, or a pH stability range of from about 5 to about 9, or a pH stability range of from about 6 to about 8. In some embodiments, the clay comprising the first immobilized cationic rare earth may be stable (for example, less than 1% by mass deterioration or decomposition, or less than 0.1% by mass deterioration or decomposition; and/or less than 0.5 ppm rare earth bleeding from a rare earth loaded substrate (i.e., the first loaded substrate), or less than 0.01 ppm rare earth bleeding from a rare earth loaded substrate (i.e., the first loaded substrate)) at such pH values for periods greater than 6 hours, such as periods greater than about 12 hours to about one week.

The structure of the first loaded substrate may vary depending on the application. In some embodiments, the clay comprising the first immobilized cationic rare earth can be used where the clay itself may be in any desired shape or form, such as the form of a particle, mesh (such as screens), tubes, honeycomb structures, monoliths, and blocks of various shapes, including, for example, cylinders. In some embodiments, the clay comprising the first immobilized cationic rare earth may be supported or coated on known solids with or without a binder. The binder may be any suitable known binder.

In the methods of the present disclosure, in addition to the methodology described above, the uptake of the rare earth into the clay to form a clay comprising the first immobilized cationic rare earth may occur by any suitable method and to any suitable extent.

In embodiments, the rare earth may be present in the clay at a weight percent of from about 0.001% to about 40% relative to the weight of the substrate alone (e.g., the clay alone), or about 1% to about 35% relative to the weight of the substrate alone (e.g., the clay alone), or about 5% to about 30% relative to the weight of the substrate alone (e.g., the clay alone), or about 20% to about 30% relative to the weight of the substrate alone (e.g., the clay alone).

In some embodiments, the first loaded substrate may include cerium (relative to the clay alone) in any desired amount, such as at least about 1,000 ppm cerium (relative to the clay alone). In some embodiments, the cerium may be present in the clay at a weight percent of from about 0.001% to about 40% relative to the weight of the substrate alone (e.g., the clay alone), or about 1% to about 35% relative to the weight of the substrate alone (e.g., the clay alone), or about 5% to about 30% relative to the weight of the substrate alone (e.g., the clay alone), or about 20% to about 30% relative to the weight of the substrate alone (e.g., the clay alone).

In some embodiments, the clay comprising the first immobilized cationic rare earth of the present disclosure may be stored for a predetermined amount of time before use. In some embodiments, the clay comprising the first immobilized cationic rare earth may be stored for minutes, hours, days, months or years before use.

In some embodiments, contact of the clay comprising the first immobilized cationic rare earth of the present disclosure with the fluid comprising the target anionic entity, such as a phosphorus-containing target anionic entity, forms a target-loaded rare earth composition that effectively removes the target anionic entity from the fluid being treated. The target-loaded rare earth composition may comprise the rare earth and the target anionic entity or a component thereof. The target-loaded rare earth composition may be an insoluble precipitate (such as an insoluble precipitate trapped in or on the clay comprising the first immobilized cationic rare earth).

In some embodiments, a phosphorus-containing target anionic entity may be removed from the fluid being treated, where the fluid has a predetermined pH value. For example, the pH of the fluid may be from about 4 to about 10, or from about 5 to about 9, or from about 6 to about 8. In some embodiments, the pH of the fluid may be of from about pH 6 to about pH 9, or from about pH 6.5 to about pH 8.5.

The effective rare earth (comprised in the clay comprising the first immobilized cationic rare earth) to target anionic entity (or phosphorus-containing target anionic entity) ratio for removing the target anionic entity from the fluid being treated may vary depending, for example on the fluid characteristics, such as the fluid pH and the concentration of the target anionic entity. For example, in order to substantially remove a target anionic entity from a given amount of a fluid with a pH of from about 6.5 to about 8.5, the (rare earth):(target anionic entity) molar ratio may be maintained from about 1:1 to about 100:1, or from about 1:1 to about 50:1.

In some embodiments, a fluid containing a target anionic entity, such as a phosphorus containing target anionic entity, may be contacted with the clay comprising the first immobilized cationic rare earth to form a precipitate of the target anionic entity, such as a phosphorus containing target anionic entity (i.e., a target-loaded rare earth composition). Contact may occur by any suitable technique, including adding the fluid to a vessel or system containing the clay comprising the first immobilized cationic rare earth or vice versa. In embodiments, the rare earth of the clay comprising the first immobilized cationic rare earth chemically interacts and/or reacts with and precipitates the phosphorus-containing target anionic entity and/or portion thereof.

In some embodiments, the rare earth of the clay comprising the first immobilized cationic rare earth chemically reacts with and precipitates at least about 80% of the target anionic entity, such as a phosphorus containing target anionic entity, such as precipitates at least about 90% of the target anionic entity, such as a phosphorus containing target anionic entity, or at least about 95% of the target anionic entity, such as a phosphorus containing target anionic entity, or at least about 99% of the target anionic entity, such as a phosphorus containing target anionic entity, or at least about 99.9% of the target anionic entity, such as a phosphorus containing target anionic entity, that is present in the fluid being treated.

The temperature of the fluid during the contacting step can vary. For example, temperature of fluid can vary depending on the source of the water. In some embodiments, the temperature of the fluid is at the IUPAC established standard temperature and pressure. In some embodiments, the fluid temperature may be a temperature in the range of from about 0 degrees Celsius to about 90 degrees Celsius, or a temperature in the range of from about 5 degrees Celsius to about 50 degrees Celsius.

In some embodiments, the fluid may be a feed stream that is made to contact and/or passed through the clay comprising the first immobilized cationic rare earth to remove the target anionic entity, such as a phosphorus containing target anionic entity, before the feed stream is available for its intended operation. The clay comprising the first immobilized cationic rare earth may have the capability of removing a substantial portion of the target anionic entity, such as a phosphorus containing target anionic entity, even when the target anionic entity, such as a phosphorus containing target anionic entity, is present in the feed stream at a low concentration (such as less than 50 ppm). Because the clay comprising the first immobilized cationic rare earth associates/reacts with and precipitates at least about 80% of the target anionic entity, such as a phosphorus containing target anionic entity, such as at least about 95% of the target anionic entity, such as a phosphorus containing target anionic entity, or at least about 99% of the target anionic entity, such as a phosphorus containing target anionic entity, or at least about 99.9% of the target anionic entity, such as a phosphorus containing target anionic entity, the feed stream that has interacted with the clay comprising the first immobilized cationic rare earth may be substantially free of target anionic entity (i.e., target anionic entity, such as a phosphorus containing target anionic entity, content in the treated feed stream is no more than about 0.1 ppm, or no more than about 0.01 ppm, or no more than about 1 ppb).

In some embodiments, the feed stream may be made to contact and/or passed through the clay comprising the first immobilized cationic rare earth in a single pass operation to remove the target anionic entity, such as a phosphorus containing target anionic entity. When the target anionic entity, such as a phosphorus containing target anionic entity, contacts the clay comprising the first immobilized cationic rare earth, a precipitate of the target anionic entity, such as a phosphorus containing target anionic entity, may be formed.

In some embodiment, the methods of the present disclosure may comprise removing a treated fluid from the substrate, the treated fluid having an amount of the target anionic entity that is lower than an amount of the target anionic entity in the fluid that contacts the at least one substrate, and determining the amount of the target anionic entity in the treated fluid, and performing a regenerating step if the amount of the target anionic entity in the treated fluid exceeds a threshold amount, such as at least 0.1 ppm of a target anionic entity dissolved within the fluid, or at least 0.5 ppm of a target anionic entity dissolved within the fluid, or at least 1.0 ppm of a target anionic entity dissolved within the fluid.

In some embodiments, when the clay comprising a first immobilized cationic rare earth (e.g., cerium) is loaded with a precipitate of a phosphorus containing target anionic entity to a maximum capacity, the usable form of the clay (for removal of the phosphorus containing target anionic entity) may be regenerated, recycled, removed and/or disposed of (as described above).

A Ligand Bonded Substrate Including an Immobilized Cationic Rare Earth

In some embodiments, the methods, compositions and systems of the present disclosure may include a second loaded substrate, such as a chelating resin, that is capable of immobilizing a cationic form of a rare earth. For example, the cationic form of the rare earth may be temporarily immobilized by the second loaded substrate in a manner such that it can be released (optionally by a triggering event brought about by a predetermined condition, such as the presence of the target anionic entity in the substrate) such that the cationic form of the rare earth is available to participate in a solution reaction that precipitates the target anionic entity and form an insoluble target-loaded material that may be further processed (such as by filtering and/or a further reaction).

The insoluble target-loaded material may be an insoluble composition comprising a rare earth (such as cerium) and the target anionic entity (such as a phosphorus containing anion), where the insoluble target-loaded material may be reacted (such as with a weak acid) to remove the target anionic entity and recapture the rare earth in a way that it can be reused for precipitating further target anionic entities. For example, the insoluble target-loaded material may be an insoluble target-loaded cerium composition comprising cerium (III) and/or cerium (IV), where the insoluble target-loaded cerium composition may be reacted (such as with a weak acid) to remove the target anionic entity (such as a phosphorus containing anion) and recapture the cerium in a way that it can be reused for precipitating further target anionic entities. In some embodiments, the target anionic entity may be further processed into a desired chemical product that may be used in a separate process.

In some embodiments, the rare earth and/or rare earth cation that participates in the selective precipitation reaction with the target anionic entity is immobilized on a substrate to form the second loaded substrate. For example, the rare earth and/or the rare earth cation (such as cerium (III)) may be bonded, compounded, held and/or absorbed on (or in the pores of) a substrate (such as a chelating resin) to form the second loaded substrate prior to the event/reaction that results in precipitation of the target anionic entity.

The second loaded substrate may be comprised in a known vessel or known apparatus, and/or may be in any suitable form, such as, for example, a shaped substrate, a porous substrate of any desirable shape, or a particulate substrate dispersed in a liquid formulation. In some embodiments, the rare earth comprised on (or in a porous interior of) the second loaded substrate may be in elemental, ionic and/or compounded forms. The second loaded substrate can be supported or unsupported. In some embodiments, the second loaded substrate may comprise one or more rare earths.

In some embodiments, the methods of the present disclosure may comprise forming a substrate (i.e., a second loaded substrate) capable of immobilizing a cationic form of a rare earth that can be released into the bulk of the solution being treated. In some embodiments, the cationic form of the rare earth is immobilized on (or in a porous interior of) the second loaded substrate in a manner such that it can be released (optionally by a triggering event brought about by the presence of the target anionic entity). The cationic form of the rare earth thus may be available to participate in a solution reaction, such as a reaction that precipitates the target anionic entity.

In some embodiments, the second loaded substrate may comprise one or more different chelating resins. One or more rare earths may be comprised on (or in a porous interior of) the second loaded substrate may be immobilized on one or more chelating resins. For example, the one or more rare earths may be bound to one or more chelating ligands (capable of releasing the rare earth for participation in precipitation reactions) to form the second loaded substrate of the present disclosure.

Exemplary chelating ligands of the second loaded substrates of the present disclosure may include carboxylic acids, phosphonic acids, dithiocarbamates, polyethyleneimines, polyamines, hydroxy amines, aminocarboxylic acids aminoalkylphosphonates, nitrilotriacetic acid, ethylenediamine tetraacetic acid (EDTA), diethylenetriamine pentaacetic acid, tris(carboxymethyl)amine, iminodiacetic acid, N-(carbamoylmethyl)iminodiacetic acid, N,N-bis(carboxymethyl)-B-alanine and N-(phosphonomethyl)iminodiacetic acid.

The chelating ligand may be bonded to any suitable compound, polymer and/or material, provided that the compound, polymer and/or material having this chelating functional group (i) does not interfere with the formation of bond(s) (such as coordinate bonds) between the chelating ligand and the rare earth, and (ii) is capable of producing chelating material and/or chelating resin that is stable (thermally and chemically) in under the treating conditions (e.g., the chemical/physical environment of the liquid being treated (i.e., the chemical/physical environment (e.g., the surrounding chemicals, pH, temperature, etc.,) of the aqueous stream, drinking water, potable water, recreational water, water derived from a manufacturing process, wastewater, pool water, spa water, cooling water, boiler water, process water, municipal water, sewage water, agricultural water, ground water, power plant water, remediation water, co-mingled water and combinations thereof)).

In some embodiments, the polymers to which the chelating ligand may be bonded may be selected from the group consisting of thermosetting polymers, thermoplastic polymers, elastomeric polymers, and cellulosic polymers. In some embodiments, the polymers comprising the chelating ligands may be crosslinked.

Suitable chelating resins may be commercially available chelating resins (such as, for example, those of the DIAION™ chelating resin series or may be made from a vinyl polymer or copolymer that is haloalkylated, where the chelating ligands are subsequently substituted onto the haloalkylated polymer or copolymer. For example, chelating resins may be prepared from the haloalkylated polymer or copolymer by contact with an amine compound capable of replacing the halogen of the haloalkyl group with an amine-based functional group. In some embodiments, the chelating resins may be prepared, for example, by contacting the haloalkylated polymer or copolymer with an aminopyridine compound, such as a 2-picolylamine. Chelating resins may also be prepared by contacting the haloalkylated polymer or copolymer with a primary amine to initially convert the polymer or copolymer to a weak-base anion-exchange resin, followed by contact with a carboxyl-containing compound to provide a chelating resin.

In some embodiments, the substrate (such as a chelating resin) used to form the second loaded substrate may be selected such that when it is exposed to a predetermined environment (such as, for example, the surrounding chemicals (i.e., the target ionic entity), pH, ionic strength, temperature, etc.), the rare earth may selectively precipitate and/or react with the target anionic entity to form rare-earth-loaded composition (for example, to be used for removing target anionic entities) and/or an insoluble target-loaded composition.

In some embodiments, the second loaded substrate (such as a chelating resin) may be porous; e.g., the substrate may be selected/prepared to have any desired pore size, such as an average pore size is in a range of from about 10 nm to about 10 µm, or an average pore size in a range of from about 100 nm to about 5,000 nm, or an average pore size in a range of from about 200 nm to about 2,000 nm.

In some embodiments, the porous substrate suitable for use in the methods of the disclosure for forming the second loaded substrate may comprise one or more of the following characteristics: a surface area (Langmuir surface area) greater than about 1 $m^2/g$; a surface area of from about 1 to about 200 $m^2/g$, or a surface area of from about 5 to about 150 $m^2/g$, or surface area of from about 10 to about 100 $m^2/g$.

In embodiments, the second loaded substrate may possess a thermal stability range (in which it will not decompose, or less than 1% by mass deterioration or decomposition, such as less than 0.5% by mass deterioration or decomposition) of at least 10° C. higher than the highest temperature that is observed in the fluid (e.g., water) being treated, such as a thermal stability range of at least up to 100° C., or a thermal stability range of greater than about −5° C. to about 100° C.

In embodiments, the second loaded substrate stability (in which it will not decompose, or less than 1% by mass deterioration or decomposition, such as less than 0.5% by mass deterioration or decomposition) that is sufficient to survive the chemical environment of the water being treated (e.g., the additional chemicals comprised in the aqueous composition being treated) for periods greater than 6 hours, such as periods greater than about 6 hours to about one week.

In embodiments, the substrate (e.g., a rare earth loaded substrate, or chelating resin) possesses a pH stability range of from about 0.5 to about 14, or a pH stability range of from about 2 to about 12, or a pH stability range of from about 5 to about 9, or a pH stability range of from about 6 to about 8. In some embodiments, the substrate (e.g., a rare earth loaded substrate, or chelating resin) may be stable (for example, less than 1% by mass deterioration or decomposition, or less than 0.1% by mass deterioration or decomposition; and/or less than 0.5 ppm rare earth bleeding from a rare earth loaded substrate, or less than 0.01 ppm rare earth bleeding from a rare earth loaded substrate) at such pH values for periods greater than 6 hours, such as periods greater than about 12 hours to about one week (i.e., until the second loaded substrate is to be used as a rare earth source for the precipitation of the target anionic entity).

The structure of the substrate to be used as the second loaded substrate may vary depending on the application. In some embodiments, chelated resin can be used where the chelated resin itself may be in any desired shape or form, such as the form of a particle, mesh (such as screens), tubes, honeycomb structures, monoliths, and blocks of various shapes, including, for example, cylinders.

In some embodiments, the substrate to be used as the second loaded substrate may include porous and fluid permeable solids having a desired shape and physical dimensions, such as porous and fluid permeable solids having a desired shape and physical dimensions in which the rare earths (or a rare earth containing substance) may be chelated, coated, trapped and/or attached to the porous and fluid permeable solid in a manner that immobilizes the rare earth such that it is available for participation in a precipitation reaction with the target anionic entity (in other words, for selective removal of a pollutant, such as a phosphorous containing pollutant).

Suitable solids may include, for example, a sintered ceramic, sintered metal, micro-porous carbon, glass fiber, cellulosic fiber, alumina, gamma-alumina, activated alumina, acidified alumina, a metal oxide containing labile anions, crystalline alumino-silicate such as a zeolite, amorphous silica-alumina, clay, ferric sulfate, porous ceramic, and the like. Such solids can be in the form of mesh, such as screens, tubes, honeycomb structures, monoliths, and blocks of various shapes, including cylinders. The chelating and/or chelated resins can, for example, be supported or coated on the above solids with or without a binder. The binder may be any suitable known binder.

Suitable structural forms of the substrate to be used as the second loaded substrate can also include a woven substrate, non-woven substrate, porous membrane, filter, fabric, textile, or other fluid permeable structure. For example, chelating resin and/or chelated resin can be incorporated into or coated onto a filter block or monolith for use as a filter, such as a cross-flow type filter. The chelating resin and/or chelated resin can be in the form of particles coated on to or incorporated in the substrate.

In the methods of the present disclosure, the uptake of the rare earth into the substrate to form the "second loaded substrate" may occur by any suitable method and to any suitable extent. For example, in embodiments, the rare earth may be present in the second loaded substrate at a weight percent of from about 5% to about 0.001% relative to the weight of the substrate alone (e.g., the chelating resin alone), or about 2% or about 0.1% relative to the weight of the substrate alone (e.g., the chelating resin alone).

In some embodiments, the second loaded substrate of the present disclosure may be used for storing the rare earth for a predetermined amount of time, for example, while the rare earth is awaiting the arrival of the target anionic entity. In some embodiments, the rare earth and the second loaded substrate may be selected such that the rare earth may be temporarily stored in the second loaded substrate for a predetermined time after loading (such as minutes, hours, days or months). Subsequently, after the predetermined amount of time has passed, the rare earth may be released from the second loaded substrate, such as by exposure to a triggering event (such as the presence of a target anionic entity, a predetermined temperature, a predetermined pH, a predetermined ionic concentration, or combination thereof), into the bulk of a fluid in contact with the substrate, such as, for example, for recycling and/or to act in its intended capacity as precipitating agent for the target anionic entity.

In some embodiments, at various time during the methods of the present disclosure the second loaded substrate may comprise a mixture of rare earths with multiple naturally occurring oxidation states, such as two or more oxidation states, for example, such as a +3 and a +4 oxidation state for one or more of the rare earths, such as cerium. In some embodiments, the cationic rare earth of the at least one substrate may only be present in a single naturally occurring oxidation state.

In some embodiments, the second loaded substrate may include those where at least some of the rare earth has a +3 oxidation state (when loaded on the substrate), for example, at least about 75 wt % of the rare earth has a +3 oxidation state, such as at least about 95 wt % of the rare earth has a +3 oxidation state, or at least about 99.9 wt % of the rare earth has a +3 oxidation state.

In some embodiments, the second loaded substrate may comprise a mixture of rare earths with +3 and +4 oxidation states. For example, in some embodiments, rare earths with a +3 oxidation state may be exposed to an oxidizing agent (optionally in situ) to generate the rare earths having a +4 oxidation state. The term "oxidizing agent" refers to one or both of a chemical substance and physical process that transfers and/or assists in removal of one or more electrons from a substance.

The second loaded substrate having a mixture of rare earths with +3 and +4 oxidation states may provide advantages over compositions having a single oxidation state. For example, in the second loaded substrate comprising cerium as the rare earth, the cerium may be primarily be in the form of cerium (III), with the remaining cerium being present as cerium (IV). The second loaded substrate comprising cerium (IV) (in addition to cerium (III)) may take advantage of the oxidation/reduction chemistries of cerium (IV), such as, the strong interaction of cerium (IV) with phosphorus-containing target entities having multiple oxidation states. For example, cerium (IV) may oxidize phosphorus-containing target entities having a phosphorus oxidation state of (II) or (III) to phosphorus-containing target entities having a phosphorus of a higher oxidation state, which may be easier to selectively precipitate.

In some embodiments, the second loaded substrate (including a second loaded substrate comprising a mixture of rare earths with +3 and +4 oxidation states) may be formed by adding one or more rare earth salts to a solution containing a substrate, such as a chelating resin. For example, suitable rare earth salts for preparing cerium and/or lanthanum loaded substrate include, for example, cerium (III) salts (such as cerous chloride, cerous bromide, cerous iodide, cerous sulfate, cerous nitrate, cerous chlorate, and cerous oxalate), ceric (IV) salts (such as ceric chloride, ceric bromide, ceric iodide, ceric sulfate, ceric nitrate, ceric chlorate, and ceric oxalate), lanthanum (III) salts (such as lanthanum chloride, lanthanum bromide, lanthanum iodide, lanthanum chlorate, lanthanum sulfate, lanthanum oxalate, and lanthanum nitrate), and mixtures thereof. Known salts of the other rare earths may also be used to generate the respective rare earth loaded substrate.

In some embodiments, the second loaded substrate may include cerium (III) (relative to the substrate alone) in any desired amount, such as at least about 1,000 ppm cerium (III) (relative to the substrate alone), or from about 1,000 ppm to about 100,000 ppm cerium (III) (relative to the substrate alone), or from about 5000 ppm to about 50,000 ppm cerium (III) (relative to the substrate alone).

In some embodiments, the second loaded substrate may include at least about 10 ppm cerium (IV) (relative to the substrate alone), such as from about 10 ppm to about 10,000 ppm cerium (IV) (relative to the substrate alone), or from about 100 ppm to about 1000 ppm cerium (IV) (relative to the substrate alone). In some embodiments, the molar ratio of cerium (III) to cerium (IV) may be from about 1 to about $1\times10^{-6}$, such as from about 1 to about $1\times10^{-3}$, or from about 1 to about $1\times10^{-2}$.

In some embodiments, the second loaded substrate may be a cerium (III) loaded substrate, which, in addition to cerium, comprises one or more other water-soluble rare earths at any desired molar ratio to the cerium (III). The rare earth elements other than cerium may include yttrium, scandium, lanthanum, praseodymium, neodymium, samarium, europium, gadolinium, terbium, dysprosium, holmium, erbium, thulium, ytterbium, and lutetium. For example, the second loaded substrate may contain cerium (III) and one or more other water-soluble trivalent rare earth (such as, for example, one or more of lanthanum, neodymium, praseodymium and samarium). The molar ratio of cerium (III) to the other trivalent rare earth may be from about 1:1 to about 50:1, or from about 5:1 to about 40:1, or about 15:1 to about 30:1.

In some embodiments, less than about 0.5% mass (or less than about 0.01% mass) of the rare earth (based on the entire mass of the rare earth in second loaded substrate) may remain after the second loaded substrate is exhausted of the rare earth initially loaded thereon, such as exposure to a fluid/solvent, such as an aqueous fluid (with a pH in the range of from about 5.0 to about 9, or a pH in the range of from about 6.0 to about 8, or pH in the range of from about 6.5 to about 7.5, or a neutral pH (e.g., a pH of 7) relatively rich in the target anionic entity (i.e., prolonged exposure to fluids in which the target anionic entity is present in amounts to the extent that it would be beneficial to remove the target anionic entity, such as at least 2 ppm of a target anionic entity dissolved within the fluid, at least 5 ppm of a target anionic entity dissolved within the fluid, or at least 10 ppm of a target anionic entity dissolved within the fluid).

For reasons of simplicity, mention will only be made in the text below of the application of a phosphorus-containing target anionic entity; however, the target anionic entity may be any of those described above.

The fluid that is treated by the methods, compositions and systems of the present disclosure may contain one or more phosphorus-containing target anionic entities. The one or more phosphorus-containing target entities may include one or both of inorganic and organic phosphorus-containing compounds.

Inorganic phosphorus-containing compounds may include inorganic phosphate compounds, phosphite compounds, phosphorus oxyhalide (e.g., phosphorus oxychloride), phosphorus thiohalide (e.g., phosphorus thiochloride), phosphorus selenohalide (e.g., phosphorus selenochloride), phosphorus trihalide (e.g., phosphorus trichloride), phosphorus pentahalide (e.g., phosphorus pentachloride), phosphoric acid, and phosphorus acid and salts thereof (e.g., cyclic phosphate and phosphite salts).

Organic phosphorus-containing compounds may include organophosphorus compounds (such as organophosphates (or organic phosphate compounds), organophosphites (or organic phosphite compounds), and organophosphines, (or organic phosphines)).

In some embodiments, contact of the rare earth with the phosphorus-containing target anionic entity forms a target-loaded rare earth composition. The target-loaded rare earth composition comprises the rare earth and the phosphorus-containing target anionic entity or a component thereof. The target-loaded rare earth composition can be in the form of an insoluble solid material either contained within the pores of substrate (such as a second loaded substrate that has been exhausted of rare earth attached by a chelating resin), within the water and/or within an insoluble solid material phase separated from the water. The target-loaded rare earth composition may be one or more of an insoluble precipitate, such as an insoluble solid particle suspended within the water, a flocculated solid particle, and a combination thereof.

In some embodiments, the phosphorus-containing target anionic entity is removed from the fluid, where the fluid has a predetermined pH value. For example, the pH of the fluid may be from about 2 to about 12, or from about 4 to about 10, or from about 5 to about 9, or from about 6 to about 8. In some embodiments, the pH of the fluid may be of from about pH 6 to about pH 9, or from about pH 6.5 to about pH 8.5.

The rare earth to phosphorus (in the phosphorus-containing target anionic entity) ratio may vary depending, for example on the fluid characteristics, such as the fluid pH and the concentration of the phosphorus-containing target anionic entity. For example, in order to substantially remove the phosphorus containing target anionic entity from a given amount of a fluid with a pH of from about 6.5 to about 8.5, the (rare earth):(phosphorus containing target anionic entity) molar ratio may be maintained from about 1:1 to about 100:1, or from about 1:1 to about 50:1.

In embodiments, the fluid containing the phosphorus containing target anionic entity is contacted with the second loaded substrate to form a metal precipitate of the phosphorus containing target anionic entity (i.e., a target-loaded rare earth composition). Contact may occur by any suitable technique, including adding the fluid to a vessel or system containing one or more of the second loaded substrate or vice versa. In embodiments, the rare earth of the second loaded substrate chemically reacts with and precipitates the phosphorus-containing target anionic entity and/or portion thereof. In some embodiments, the rare earth of the second loaded substrate chemically reacts with and precipitates at least about 80% of the phosphorus-containing target anionic entity, such as precipitates at least about 90% of the phosphorus-containing target anionic entity, or at least about 95% of the phosphorus-containing target anionic entity, or at least about 99% of the phosphorus-containing target anionic entity, or at least about 99.9% of the phosphorus-containing target anionic entity, that is present in the fluid.

The temperature of the fluid during the contacting step can vary. For example, temperature of fluid can vary depending on the source of the water. In some embodiments, the temperature of the fluid is at the IUPAC established standard temperature and pressure. In some embodiments, the fluid temperature may be a temperature in the range of from about 0 degrees Celsius to about 90 degrees Celsius, or a temperature in the range of from about 5 degrees Celsius to about 50 degrees Celsius.

In some embodiments, the fluid may be a feed stream that is made to contact and/or passed through the second loaded substrate to remove the phosphorus containing target anionic entity before the feed stream is available for its intended operation. The second loaded substrate may have the capability of removing a substantial portion of the phosphorus containing target anionic entity, even when the phosphorus containing target anionic entity is present in the feed stream at a low concentration (such as less than 50 ppm). Because the rare earth of the second substrate reacts with and precipitates at least about 80% of the phosphorus containing target anionic entity, such as at least about 95% of the phosphorus containing target anionic entity, or at least about 99% of the phosphorus containing target anionic entity, or at least about 99.9% of the phosphorus containing target anionic entity, the feed stream that has interacted with the substrate may be substantially free of target anionic entity (i.e., phosphorus containing target anionic entity content in the treated feed stream is no more than about 0.1 ppm, or no more than about 0.01 ppm, or no more than about 1 ppb).

In some embodiments, the feed stream may be made to contact and/or passed through the second loaded substrate in a single pass operation to remove the phosphorus containing target anionic entity. When the phosphorus containing target anionic entity contacts the rare earth in the second loaded substrate, a metal precipitate of the phosphorus containing target anionic entity may be formed. In some embodiments, the metal precipitate of the phosphorus containing target anionic entity may be formed in the feed stream surrounding the substrate (such as, for example, in the feed stream contacting the surface of a substrate, or in the feed stream that may enter pores of a porous substrate).

In some embodiments, when the second loaded substrate is depleted of accessible rare earth, the substrate may be regenerated, recycled, removed and/or disposed of. For example, the substrate (such as a rare earth depleted substrate) may also be regenerated and reused by treating metal precipitate of the phosphorus containing target anionic entity (i.e., the insoluble target-loaded composition) with an appropriate reagent, such as an acid or base solution.

In some embodiment, the methods of the present disclosure may comprise removing a treated fluid from the substrate, the treated fluid having an amount of the target anionic entity that is lower than an amount of the target anionic entity in the fluid that contacts the at least one substrate, and determining the amount of the target anionic entity in the treated fluid, and performing a regenerating step if the amount of the target anionic entity in the treated fluid exceeds a threshold amount, such as at least 0.1 ppm of a target anionic entity dissolved within the fluid, or at least 0.5 ppm of a target anionic entity dissolved within the fluid, or at least 1.0 ppm of a target anionic entity dissolved within the fluid.

In one aspect of the present disclosure, some embodiments may relate to a composition for treating a fluid containing one or more target anionic entities, the composition comprising: a second loaded substrate comprising a second immobilized rare earth, wherein the second immobilized rare earth is bonded to the substrate via a chelating ligand. In such embodiments the second immobilized rare earth may be cerium; the chelating ligand may be a carboxylic acid; the substrate of the second loaded substrate may be a chelating resin comprising one or more polymers having a chelating ligand (where the one or more polymers may be selected from the group consisting of thermosetting polymers, thermoplastic polymers, elastomeric polymers, and cellulosic polymers); the second loaded substrate may comprise, by wt % with respect to the total weight of the substrate: from about 0.1 wt % to about 5.0 wt % of the second immobilized rare earth; the substrate may be composed of particles having a surface area of at least about 1 m$^2$/g; at least half of the cerium may be bonded to an outer surface of the substrate; the substrate may possess a pH stability range of from a pH of about 6 to about 9; the thermal stability range of such a composition may be greater than about −5° C. to about 100° C.; the substrate may have a capacity for precipitating or removing phosphate from an aqueous composition of at least about 0.1 mg of phosphate per gram of the substrate; at least a portion of the cerium bonded to the substrate may be cerium (III), and at least a portion of the cerium bonded to the substrate may be cerium (IV); the portion of cerium (III) bonded to the substrate may be at least about 95% by weight of the total cerium in the substrate; the portion of cerium (IV) bonded to the substrate may be at least about 5% by weight of the total cerium in the substrate; the chelating resin may be crosslinked; and the substrate may further comprise one or more members selected from the group consisting of lanthanum, praseodymium, neodymium, promethium, samarium, europium, gadolinium, terbium, dysprosium, holmium erbium, thulium, ytterbium and lutetium, bonded to the substrate via a chelating ligand.

In one aspect of the present disclosure, some embodiments may relate to a method, comprising: contacting a fluid comprising a target anionic entity with a second loaded substrate comprising a second immobilized rare earth to remove at least a portion of the target anionic entity from the fluid to form a treated fluid, wherein the second immobilized rare earth is bonded to the substrate via a chelating ligand. In such embodiments, the target anionic entity may be selected from the group consisting of a phosphate, an arsenate, a chromate, a fluoride, a perchlorate, a phosphorus-containing anion, an arsenic-containing anion, a fluorine-containing anion, and a chromium-containing anion; the target anionic entity may be comprised in the fluid that initially contacts the substrate in an amount greater than 10 ppm; an amount of the target anionic entity in the treated fluid may be 95% by weight less than the amount of target anionic entity in the fluid that initially contacted substrate; the second immobilized rare earth may be cerium; the chelating ligand may be a carboxylic acid; the substrate may be a chelating resin comprising one or more polymers having a chelating ligand; the one or more polymers may be selected from the group consisting of thermosetting polymers, thermoplastic polymers, elastomeric polymers, and cellulosic polymers; the second loaded substrate may comprise, by weight percent (wt %) with respect to the total weight of the substrate from about 0.1 wt % to about 5.0 wt % of the second immobilized rare earth; the substrate may be composed of particles having a surface area of at least about 1 m$^2$/g; at least half of the cerium may be bonded to an outer surface of the substrate; the substrate may possess a pH stability range of from a pH of about 6 to about 9; the substrate may possess a thermal stability range of greater than about −5° C. to about 100° C.; the substrate may have a capacity for precipitating or removing phosphate from an aqueous composition of at least about 0.1 mg of phosphate per gram of the substrate; at least a portion of the cerium may be bonded to the substrate is cerium (III), and at least a portion of the cerium may be bonded to the substrate cerium (IV); the portion of cerium (III) bonded to the substrate is at least about 95% by weight of the total cerium in the substrate; the portion of cerium (IV) bonded to the substrate may be at least about 5% by weight of the total cerium in the substrate; the chelating resin may be crosslinked. the substrate may further comprises one or more members selected from the group consisting of lanthanum, praseodymium, neodymium, promethium, samarium, europium, gadolinium, terbium, dysprosium, holmium erbium, thulium, ytterbium and lutetium, bonded to the substrate via a chelating ligand; the target anionic entity may be a phosphorus-containing target anionic entity; the contacting step may comprise: contacting the fluid with an oxidizing agent to oxidize the phosphorus-containing target anionic entity to form an oxidized phosphorus-containing target anionic entity, the oxidized phosphorus-containing target anionic entity having different structure than the phosphorus-containing target anionic entity, and contacting the oxidized phosphorus-containing target anionic entity with the substrate to remove the oxidized phosphorus-containing target anionic entity from the fluid; contacting the fluid with the substrate may remove at least 99% by weight of the second immobilized rare earth from the substrate to form a rare earth depleted substrate; the method may further comprise preparing a rare earth loaded substrate from the rare earth depleted substrate; the rear earth may be removed from the substrate is used to prepare the rare earth loaded substrate from the rare earth depleted substrate; the target anionic entity may be a phosphate; the method may further comprise forming a fertilizer or specialty chemical from at least a portion of the portion of the target anionic entity removed from the fluid; the fertilizer may be an ammonium phosphate nutrient solution; and the specialty chemical may be a phosphoric acid solution.

In one aspect of the present disclosure, some embodiments may relate to an apparatus for removing one or more target anionic entities from a fluid, the apparatus comprising a container, a support structure provided in the container, a rare earth material that is immobilized on a surface of the support structure in an amount of from about 0.1 wt % to about 5.0 wt % of the weight of the support structure, wherein the rare earth material can be removed from the surface of the support structure when it bonds with the target anionic entities. In such embodiments, the rare earth material may be cerium; and the support structure may be a chelating resin.

Separation of Target-Loaded Rare Earth Composition from Aqueous Media

The insoluble target-loaded rare earth composition (formed as a result of the use of either of the above substrates) may be removed by any suitable technique, such as by a liquid/solid separation system. Examples of liquid/solid separation systems are filtration, floatation, sedimentation, cyclone, and centrifuging. In some embodiments, the substrate may be in the form of a particulate bed or supported porous and permeable matrix, such as a filter, through which the fluid passes.

In some embodiments, the treated fluid has a lower content of at least one of the one or more phosphorus-containing target anionic entities compared to the initial fluid (subject to treatment). For example, in some embodiments, the treated fluid content for the one or more phosphorus-containing target anionic entities may be less than about 95% of that the initial fluid (prior to treatment), such as less than about 99.9% of that the initial fluid (prior to treatment). In some embodiments, the phosphorus-containing target anionic entity content in the treated fluid is no more than about 0.5 ppm, or no more than about 0.1 ppm, or no more than about 10 ppb.

In some embodiments, one or more of the above described substrates of the present disclosure may be used to remove a phosphorus containing target anionic entity in an initial fluid (subject to treatment) having a concentration of less than about 50 ppm, such as a concentration of phosphorus containing target anionic entity in the range of from about 30 ppm to about 50 ppm. The above described substrates may be used to reduce the concentration of the phosphorus containing target anionic entity in the initial fluid (subject to treatment) to a concentration of less than approximately 0.1 ppm, such less than 10 ppb, or less than 1 ppb. In some embodiments, the use of one or more of the above described substrates provides a large surface area and a consequent increased capacity for the phosphorus containing target anionic entity, such that large volumes of the initial fluid (subject to treatment) may be passed through the substrates. For example, in some embodiments, one liter of the above described substrates may be used to treat from about 50 bed volumes to about 500 bed volumes of the initial fluid (subject to treatment) having a concentration of phosphorus containing target anionic entity in the range of from about 30 ppm to about 50 ppm. In some embodiments, the substrate has a capacity for removing the phosphorus containing target anionic entity (from an initial fluid (subject to treatment)) of at least about 0.01 mg of phosphorus containing target anionic entity per gram of the substrate, such as about 0.01 mg to about 50 mg of phosphorus containing target anionic entity per gram of the substrate, or about 0.05 mg to about 1 mg of phosphorus containing target anionic entity per gram of the substrate.

In some embodiments, the pH of the initial fluid (subject to treatment) may be maintained at at least about 6 to remove the phosphorus containing target anionic entity. For example, the pH of the initial fluid (subject to treatment) may be maintained in a range of from about 6 to about 9, such as in a range of from about 6 to about 8.

Water Control System

In some embodiments, the fluid that is relatively rich in a target anionic entity (i.e., target anionic entity is present a concentration at which it is desirable to remove) may be obtained from one or more of the above-mentioned sources and processed, conveyed and/or manipulated by a water control system. In some embodiments, the above described substrates may be packed into a bed that may be used at any desired point in a water control system and/or treatment operation. Packed beds are known in the art and, therefore, the formation of the packed bed is not described in detail herein. The packed bed may include a housing within which the rare earth loaded substrate (e.g., a first loaded substrate and/or second loaded substrate) is contained. In some embodiments, spherical beads of the above described substrates may be packed so that spaces are present between the spherical beads to allow the feed stream to contact and/or pass through the packed bed. Once the feed stream has passed through the packed bed and the phosphorus containing target anionic entities are removed, the feed stream may be used for any desired suitable purpose.

Likewise, the insoluble target-loaded composition, may be further processed, such as via one or more further reactions and/or process steps, to generate a fertilizer (e.g., an ammonium phosphate nutrient solution and/or a specialty chemical (e.g., a phosphoric acid solution). In some embodiments, such further processing may result in a compound or solution that may be applied in an in automotive paint and coating process.

The water control system (or water handling system) components and configuration can vary depending on the treatment process, water, and water source. The methods and water control systems of the present disclosure may be adapted to include the methods of the present disclosure for removing target anionic entities, but otherwise use conventional techniques, processing units and systems known in the art.

For example, the methods of the present disclosure for removing target anionic entities may be used in conjunction with a municipal and/or wastewater control system. For example, the methods of the present disclosure may be employed as treatment of waste waters for removal of a phosphorus content therein whereby the target anionic entities present in the water, for example, from a water treatment plant, are precipitated via a reaction with a rare earth cation.

The municipal and/or wastewater control systems may have one or more of the following process units: clarifying, disinfecting, coagulating, flocculating, aerating, filtering, separating solids and liquids, digesting, and polishing. The methods of the present disclosure may be employed before, during and/or after the water is being treated by any of the above processing units.

For example, the methods of the present disclosure may be employed removing biological matter (such as bacteria and/or algae), suspended and/or dispersed chemicals and/or particulates from the water, such as by the action of one or more clarifying and/or filtering units.

In some embodiments, the methods of the present disclosure may include a water control system that includes aeration. Within the water control system, aeration may comprise passing a stream of air and/or molecular oxygen through the water contained in the water control system. The aeration process may promote oxidation of contaminants contained in the water being processed by the water control system. For example, aeration may promote the oxidation of biological contaminates, such as phosphorus-containing compounds. In some embodiments, the aeration process converts the phosphorus-containing compound into a phosphorus-containing target anionic entity that can be removed by the methods of the present disclosure.

The water control system may or may not have one or more of a heater, a cooler, and a heat exchanger to heat and/or cool the water being processed by the water control system. The heater may be any method suitable for heating the water. The cooler may be any method suitable for cooling the water.

The water control system may or may not include a nutrient control process. If included, the water control system may include one or more nutrient control processes. The nutrient control process may include phosphorus control. Phosphorus control refers to biological phosphorus control, such as controlling phosphorus that can be used as a nutrient for algae. Nutrient control may include processes associated with control of oxygen demand substances, which may include (in addition to nutrients) pathogens, and inorganic and synthetic organic compositions. In some embodiments, the nutrient control converts phosphorus-containing compounds into a phosphorus-containing target anionic entity that can be removed by the methods of the present disclosure.

The water control system may or may not include a solid/liquid separation process. For example, the water control system may include one or more solid/liquid separation processes. The solid/liquid separation process can comprise any process for separating a solid phase from a liquid phase, such as water. Examples of suitable solid/liquid separation processes are clarification (including trickling filtration), filtration, vacuum and/or pressure filtration, cyclone (including hydrocyclones), floatation, sedimentation (including gravity sedimentation), coagulation, sedimentation (grit chambers), and combinations thereof.

The water control system may or may not include a polisher. The polishing process may include one or more of removing fine particulates and/or precipitates from the water, an ion-exchange process to soften the water, an adjustment to the pH value of the water, or a combination thereof.

While the water control system may include one or more of a clarifying, disinfecting, coagulating, aerating, filtering, separating solids and liquids, digesting, and polishing processes, the water control system may further include additional processing equipment, such a backwash system equipment (which, for example, may be used to generate a fertilizer, and implement a process relating to the phosphatizing aspect of e-coat).

The additional processing equipment may include holding tanks, reactors, purifiers, treatment vessels or units, mixing vessels or elements, wash circuits, precipitation vessels, separation vessels or units, settling tanks or vessels, reservoirs, pumps, cooling towers, heat exchangers, valves, boilers, gas liquid separators, nozzles, tenders, and the like. Furthermore, the water control system includes conduit(s) interconnecting the unit operations and/or additional processing equipment. The conduits may include piping, hoses, channels, aqua-ducts, ditches, and such. The water is conveyed to and from the unit operations and/or additional processing equipment by the conduit(s). Moreover, each unit operations and/or additional processing equipment is in fluid communication with the other unit operations and/or additional processing equipment by the conduits.

The foregoing is further illustrated by reference to the following examples, which are presented for purposes of illustration and are not intended to limit the scope of the present disclosure.

EXAMPLES

Example 1 and Comparative Example 1

20 grams of a chelating resin (DIAION™ CR11, which has a iminodiacetic acid group as chelating ligand which is bonded onto a highly porous crosslinked polystyrene matrix; "Example 1" resin) and 20 grams of cation resin (i.e., a conventional gel polystyrene strong acid cation exchange resin; "Comparative Example 1" resin) were both washed with 100 ml 1N HCl, followed by 100 ml reverse osmosis water (RO water) and 100 ml 1 N NaOH.

Both resins were soaked in 100 ml of CeCl brine solution (33% CeCl brine), which was adjusted to a pH value of 4+/−0.2 for 45 minutes with 1N HCl and 1 N NaOH.

After the resins were soaked for 45 minutes, they were both washed with 1000 ml of RO water to remove any unbound cerium (i.e., the non-chelated cerium) that was physically adhered (i.e., lacking a coordinate bond to the substrate) on the surface on the surface of the resin and not immobilized.

A standard solution of 32 ppm of phosphate ion (pH 7.8) was prepared from anhydrous $Na_2HPO_4$ and confirmed using Ion Chromatography.

100 ml aliquots of the 32 ppm phosphate ion stock solution were passed through a 40 mm diameter glass tube with fine mesh on one end to hold 20 gram samples of the resins until breakthrough was observed. In the test, the 100 ml aliquots were poured in the tube all at once and allowed to gravity filter/drain.

For the Comparative Example 1 resin, breakthrough was observed within the first 100 ml aliquot (14.8 ppm), as illustrated in FIG. 1.

For the Example 1 resin, first breakthrough was observed after 600 ml of stock solution were passed (1.2 ppm). After 3400 ml the phosphate ion concentration was 12.6 ppm using the Example 1 resin. The same amount of breakthrough as observed with the first 100 ml aliquot for the Comparative Example 1 resin (14.8 ppm) was reached within the first 3400 ml of standard solution that was passed through the Example 1 resin.

Example 2 and Comparative Example 2

Figure 2A:
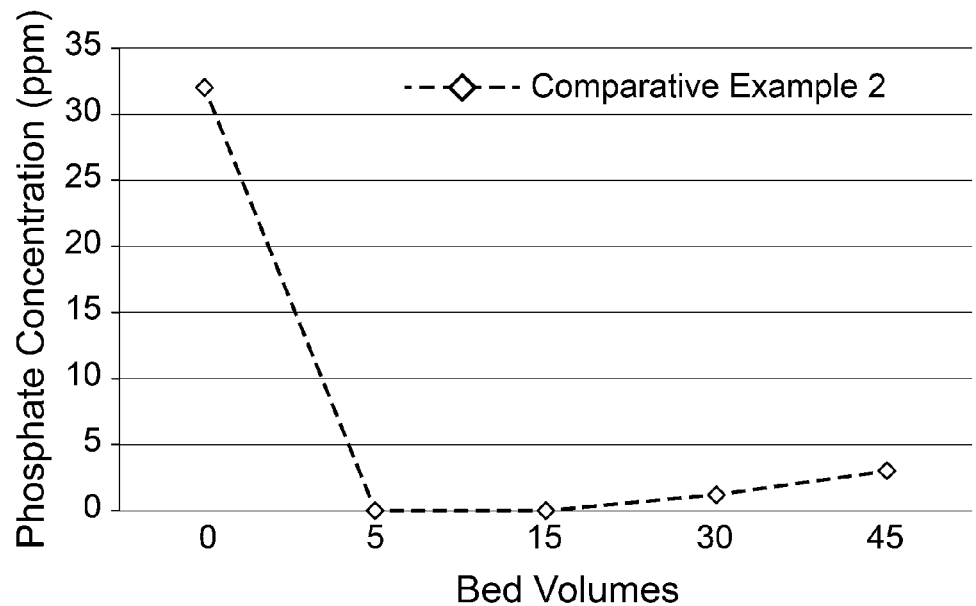
FIGS. 2A and 2B are illustrations of the breakthrough curve profiles of the resins of Example 2 and Comparative Example 2.
Figure 2B:
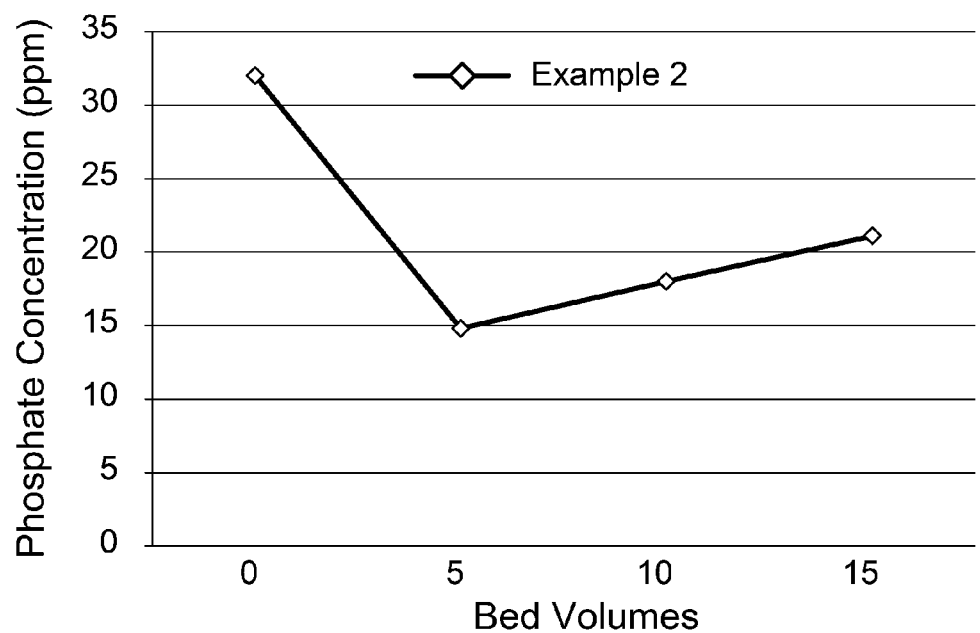

For the tests illustrated in FIGS. 2A and 2B, the Example 2 resin and the Comparative Example 2 resin were prepared in the same manner as described in the above. Additionally, the same standard solution of 32 ppm of phosphate ion was used in these tests. The bed volume was 20 grams of resin (100 ml of the standard solution of 32 ppm of phosphate ion as added in a single aliquot.

For the Comparative Example 2 resin, breakthrough was observed within the first 100 ml aliquot (14.8 ppm).

For the Example 2 resin, first breakthrough was observed after 600 ml of stock solution were passed (1.2 ppm). After 3400 ml the phosphate ion concentration was 12.6 ppm using the Example 2 resin. The same amount of breakthrough as observed with the first 100 ml aliquot for the cationic resin (14.8 ppm) was reached within the first 3400 ml of standard solution that was passed through the Example 2 resin.

The data in FIGS. 2A and 2B demonstrate that for the Example 2 resin (having an ionic chelating ligand), after five, 10 and 15 bed volumes of stock solution were passed, the breakthrough concentration of phosphate observed was at least an order of magnitude lower than that of the cation resin (having an neutral chelating ligand).

Example 3

Figure 3:
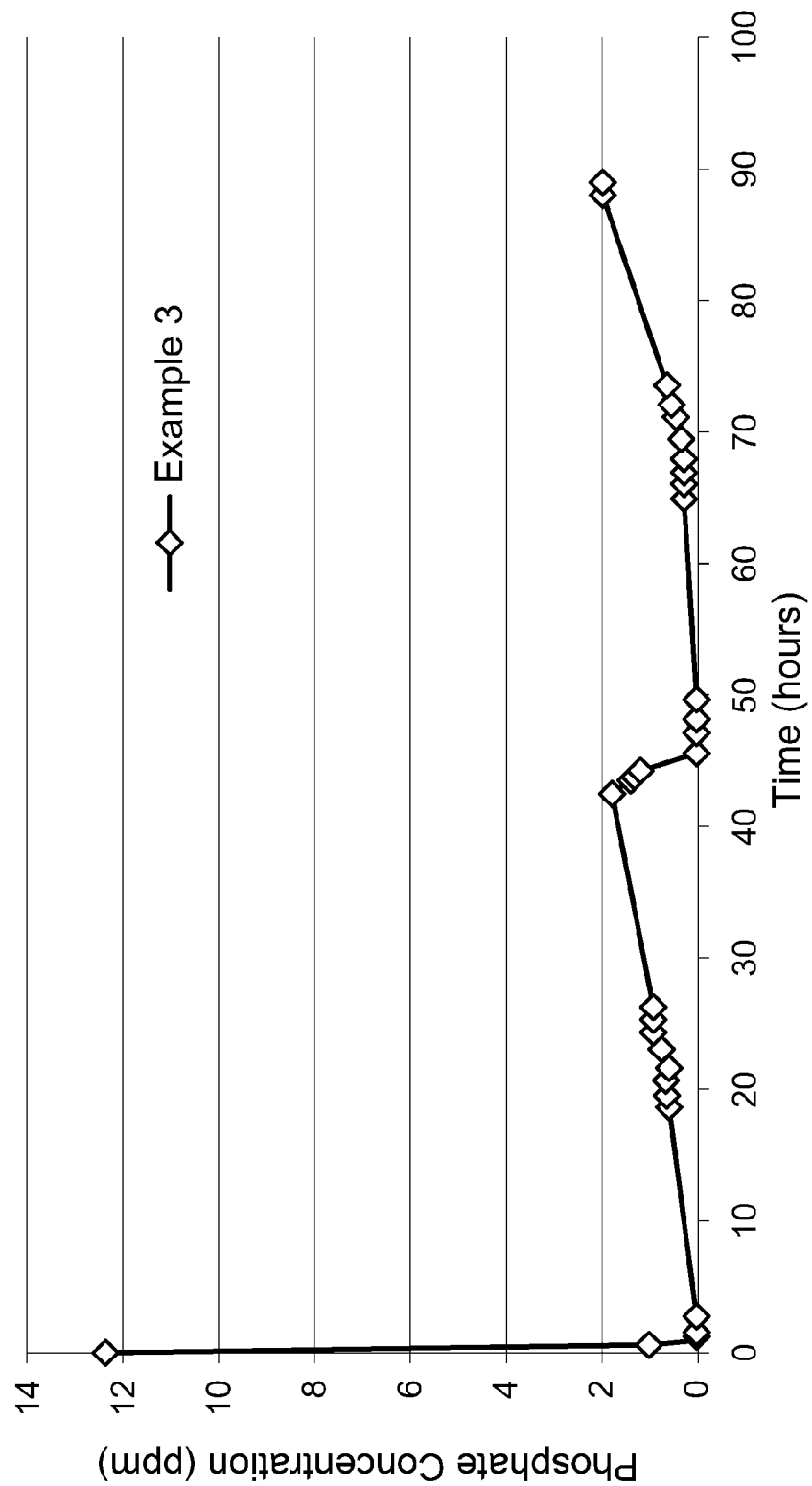
FIG. 3 is an illustration of the breakthrough curve profiles of the clay substrate of Example 3.

For the tests illustrated in FIG. 3 (the data was acquired using Ion Chromatography, in a manner similar to that described above), the loaded clay that was tested was created by mixing 500 grams of sepiolite clay with 500 grams of cerium chloride for 10 minutes. 2 liters of 5% NaOH was then added and mixed for about 25 minutes. The mixture was then filtered through a sieve to remove the fine particles and the filtrate was air dried.

A glass column was packed with 200 grams of the loaded clay that was determined (by XRF analysis) to be 23.62% Cerium by weight. The loaded clay was packed in a column (with a column radius of 1.85 cm) to a height of 22.5 centimeters. A 42.8 gallon solution of 15 ppm phosphate water was created by adding 7.57 grams of sodium phosphate tribasic dodecahydrate to 42.8 gallons of water. This stock solution was passed through the column at a flow rate of 50 milliliters per minute. After running for 44 hours, the loaded clay was then regenerated by introducing a solution of 2 liters of 5% NaOH through the column at a flow rate of 30 milliliters per minute. The data in FIG. 3 reflects that regeneration by introducing a solution of 2 liters of 5% NaOH through the column at a flow rate of 30 milliliters per minute removed the phosphate from the loaded clay and was effective to render the loaded clay ready to absorb phosphate again.

Example 4

Experiments involving an X-ray photoelectron spectroscopy analysis of samples taken during a process similar to that described in Example 3 were conducted. For the X-ray photoelectron spectroscopy experiments, powdered samples were prepared and were pressed onto a strip of indium foil and mounted onto a sample holder using double-sided adhesive tape. X-ray photoelectron spectroscopy (XPS) was performed on a Thermo Scientific ESCALAB 250 spectrometer with a focused monochromatic Al Kα X-ray (1486.6 eV) source. A hemispherical analyzer with a 6-element multichannel detector was used. The incident X-ray beam was 45° off normal to the sample while the X-ray photoelectron detector was normal to the sample. Charge compensation was employed during data collection by using an internal flood gun and a low energy Ar+ external flood gun. Binding energies of the photoelectron are correlated to the aliphatic hydrocarbon C 1s peak at 284.6 eV. A Large area XL magnetic lens with a 500 um spot size in constant analyzer energy (CAE) mode was utilized with a pass energy of 20 eV. Data analysis and peak fitting was performed with CasaXPS Ver. 2.3.16 software.

All XPS spectra for were recorded in survey mode and high resolution mode (Ce region). XPS spectra were acquired for 5 samples: Sample 1: sepiolite clay (blank, no Ce/NaOH/phosphate was added); Sample 2: sepiolite clay and Ce(III) from cerium chloride (where the cerium chloride is absorbed into the sepiolite clay); Sample 3: sepiolite clay, Ce(III) from cerium chloride and NaOH (where NaOH was added to the composition formed in Sample 2 in order to precipitate the cerium); Sample 4: sepiolite clay, Ce(III) from cerium chloride, NaOH, and phosphate (where a phosphate stock solution was passed through a column comprising the composition formed in Sample 3 in order to remove the phosphate from the stock solution); and Sample 5: sepiolite clay, Ce(III) from cerium chloride, NaOH, phosphate and NaOH (where an NaOH solution was used to remove the phosphate from the composition formed in Sample 4 and regenerate a composition capable of removing further phosphate).

Analysis of the spectra data reflects that the raw sepiolite clay (Sample 1) does not have detectable amounts of cerium (e.g., there were no signals above the background in the area of binding energy at 880-916 eV). The addition of Ce(III) (from cerium chloride) to the clay (Sample 2) does not change the oxidation state of the cerium (i.e., 100 wt % Ce(III) was observed in the spectra of Sample 2). Addition of NaOH to the clay of Sample 2 resulted in a mixture of cerium oxidation states being observed in the sepiolite clay (i.e., 31.5 wt % Ce(III) and 68.5 wt % Ce(IV) was observed in the spectra of Sample 3).

After a phosphate stock solution was passed through a column comprising the composition formed in Sample 3 in order to remove the phosphate from the stock solution, the spectra data acquired from Sample 4 revealed that the distribution of cerium oxidation states shifted such that a majority of Ce(III) was present (i.e., 62.1% Ce(III) and 37.9% Ce(IV) was observed in the spectra of Sample 4). A regeneration step (addition of NaOH) to the phosphate loaded composition formed in Sample 4 shifted the distribution of cerium oxidation states such that such that a majority of Ce(IV) was present (i.e., 38.1 wt % of Ce(III) and 61.9 wt % Ce(IV) was observed in the spectra of Sample 5).

Although the preceding description has been described herein with reference to particular means, materials and embodiments, it is not intended to be limited to the particulars disclosed herein; rather, it extends to functionally equivalent structures, methods and uses, such as are within the scope of the appended claims. Furthermore, although only a few example embodiments have been described in detail above, those skilled in the art will readily appreciate that many modifications are possible in the example embodiments without materially departing from the present disclosure. Accordingly, all such modifications are intended to be included within the scope of this disclosure as defined in the following claims. It is the express intention of the applicant not to invoke 35 U.S.C. § 112(f) for any limitations of any of the claims herein, except for those in which the claim expressly uses the words 'means for' together with an associated function.

What is claimed is:

1. A method for removing one or more target anionic entities from a fluid, comprising:
performing a treatment operation comprising:
forming a treated fluid by contacting a fluid comprising a target anionic entity with a porous substrate including a cationic rare earth that is precipitated directly on one or more surfaces of the porous substrate so that the precipitated cationic rare earth is
(i) fixed or trapped inside a porous structure of the porous substrate in an immobilized state and/or
(ii) fixed on an outer surface of the porous substrate in an immobilized state,
the contacting being sufficient to remove at least a portion of the target anionic entity from the fluid comprising the target anionic entity because the target anionic entity associates with the precipitated cationic rare earth; and
then forming a regenerated porous substrate comprising the precipitated cationic rare earth by regenerating a capacity of the porous substrate for removing the target anionic entity by treating the porous substrate with a base; wherein
less than about 0.5% mass loss of the precipitated cationic rare earth occurs during the treatment operation, the mass loss being relative to an initial mass of the precipitated rare earth in or on the one or more surfaces of the porous substrate prior to the porous substrate being contacted with the fluid comprising the target anionic entity, where all remaining precipitated cationic rare earth remains in an immobilized state inside the porous structure of the porous substrate and/or remains in an immobilized state fixed on the outer surface of the porous substrate.

2. The method of claim 1, wherein the porous substrate is selected from the group consisting of clays, zeolites, polymers, resins, ceramics, and carbonaceous materials.

3. The method of claim 1, wherein the porous substrate is in the form of a particulate bed.

4. The method of claim 3, wherein the bed comprises spherical beads of the porous substrate.

5. The method of claim 1, wherein the cationic rare earth of the porous substrate includes a rare earth with multiple naturally occurring oxidation states.

6. The method of claim 1, wherein the cationic rare earth is cerium.

7. The method of claim 6, wherein prior to forming the treated fluid at least some of the cerium is precipitated as cerium (IV).

8. The method of claim 1, wherein forming the regenerated porous substrate removes the target anionic entity from the porous substrate and renders the precipitated cationic rare earth suitable for associating with further target anionic entities.

9. The method of claim 1, wherein the cationic rare earth has multiple naturally occurring oxidation states, and contacting the fluid comprising the target anionic entity with the porous substrate is effective to change the oxidation state of the precipitated cationic rare earth.

10. The method of claim 1, wherein the target anionic entity is at least one anionic entity selected from the group consisting of a phosphate, an arsenate, a chromate, a fluoride, a perchlorate, a phosphorus-containing anion, an arsenic-containing anion, a fluorine-containing anion, and a chromium-containing anion.

11. The method of claim 1, wherein the target anionic entity is a phosphate.

12. The method of claim 1, wherein
the cationic rare earth is present in the porous substrate in an amount of from about 0.1 wt % to about 40 wt % of the weight of the porous substrate.

13. The method of claim 1, wherein
the porous substrate is non-swelling in water.

14. The method of claim 1, wherein
the treatment operation results in the treated fluid having a concentration of the target anionic entity that is at least 80% less than the concentration of target anionic entity in the fluid before contacting the porous substrate, and
the regenerated porous substrate is formed such that the mass loss of the precipitated rare earth mass during the treatment operation is less than about 0.01%.

15. The method of claim 1, wherein
the treatment operation results in the treated fluid having a concentration of the target anionic entity that is at least 99% less than the concentration of target anionic entity in the fluid before contacting the porous substrate, and
the regenerated porous substrate is formed such that during the treatment operation there is no mass loss of the precipitated rare earth relative to the initial mass of the precipitated rare earth in the porous substrate.

16. The method of claim 1, wherein the target anionic entity is present in the fluid that contacts the porous substrate in an amount in the range of from 10 ppm to 50,000 ppm.

17. The method of claim 1, further comprising:
determining the concentration of the target anionic entity in the treated fluid, and
forming the regenerated porous substrate if the amount of the target anionic entity in the treated fluid exceeds a threshold amount.

18. The method according to claim 1, further comprising:
at least substantially exhausting a capacity of the porous substrate for removing the target anionic entity from the fluid before forming the regenerated porous substrate.

19. The method of claim 1, wherein the porous substrate is clay.

20. The method of claim 19, wherein the clay is sepiolite.

21. A method for removing one or more target anionic entities from a fluid, comprising:
combining a solution including a dissolved rare earth salt with a porous substrate to form an impregnated substrate in which the dissolved rare earth salt is present within a porous structure of the porous substrate, where the dissolved rare earth salt comprises a cationic rare earth having a +3 oxidation state;
contacting the impregnated substrate with a base to precipitate the cationic rare earth of the dissolved rare earth salt to form a loaded substrate in which the precipitated cationic rare earth is fixed or trapped inside the porous structure of the porous substrate in an immobilized state and/or fixed on a surface of the porous substrate in an immobilized state, wherein contacting the impregnated substrate with a base to precipitate the cationic rare earth converts at least some of the cationic rare earth in the +3 oxidation state to a +4 oxidation state, and at least some at least some of the cationic rare earth in the +4 oxidation state is precipitated in a fluid-accessible part of the loaded substrate; and performing a treatment operation, the treatment operation including:
forming an at least partially exhausted loaded substrate by contacting a fluid comprising a target anionic entity with the loaded substrate to remove at least a portion of the target anionic entity from the fluid to form a treated fluid, and
forming a regenerated loaded substrate by contacting the at least partially exhausted loaded substrate with a base wash, where the base wash removes the target anionic entity from the at least partially exhausted loaded substrate; wherein
removing at least a portion of the target anionic entity from the fluid converts at least a portion of the immobilized precipitated cationic rare earth in the +4 oxidation state to a +3 oxidation state, and
less than about 0.5% mass loss of the precipitated cationic rare earth occurs during the treatment operation, the mass loss being relative to an initial mass of the precipitated rare earth in or on the loaded substrate prior to the loaded substrate being contacted with the fluid comprising the target anionic entity, where all remaining precipitated cationic rare earth is in an immobilized state inside the porous structure of the regenerated loaded substrate and/or is fixed on the surface of the regenerated loaded substrate in an immobilized state.

22. The method of claim 21, wherein about 99.9 wt % of the cationic rare earth of the rare earth salt has a +3 oxidation state.

23. The method of claim 22, wherein contacting the impregnated substrate with the base to precipitate the cationic rare earth converts at least about 60 wt % of the cationic rare earth that had the +3 oxidation state to a +4 oxidation state.

24. The method of claim 23, wherein the removal of the target anionic entity from the fluid converts at least about 30 wt % of the immobilized precipitated cationic rare earth in the loaded substrate that had a +4 oxidation state to a +3 oxidation state.

25. The method of claim 21, wherein the treatment operation further comprises:
determining if the target anionic entity in the treated fluid exceeds a threshold amount, and
regenerating the at least partially exhausted loaded substrate to form the regenerated loaded substrate if the amount of the target anionic entity in the treated fluid exceeds the threshold amount, wherein
the regenerated loaded substrate is formed during the base wash by converting at least some of the immobilized precipitated cationic rare earth having a +3 oxidation state in the at least partially exhausted loaded substrate to a +4 oxidation state.

26. The method of claim 25, wherein regenerating the at least partially exhausted loaded substrate converts at least about 50 wt % of the rare earth in the at least partially exhausted loaded substrate to a +4 oxidation state.

27. The method of claim 25, wherein the threshold amount of the target anionic entity in the treated fluid is at least 0.1 ppm.

28. The method of claim 21, wherein the porous substrate is selected from the group consisting of clays, zeolites, polymers, resins, ceramics, and carbonaceous materials.

29. The method of claim 21, wherein the porous substrate is in the form of a particulate bed and the bed comprises spherical beads of the porous substrate.

30. The method of claim 29, wherein the porous substrate is sepiolite.

31. The method of claim 1, wherein the forming of the regenerated porous substrate comprises releasing the target anionic entity associated with the cationic rare earth into a solution to form a solution enriched with the released target anionic entity.

32. The method of claim 31, further comprising recovering the solution enriched with the released target anionic entity.

33. The method of claim 31, wherein the solution enriched with the released target anionic entity contains no cationic rare earth from the porous substrate.

34. The method of claim 31, further comprising forming a fertilizer from the released target anionic entity.

35. The method of claim 34, wherein the fertilizer includes ammonium phosphate.

36. The method of claim 31, further comprising forming a chemical product from the released target anionic entity.

37. The method of claim 36, wherein the chemical product is a phosphoric acid solution.

38. The method of claim 32, wherein the target anionic entity is phosphate and the recovered solution is enriched with phosphate in the form of a metal phosphate.

39. The method of claim 38, wherein the metal phosphate is sodium phosphate.

40. The method of claim 1, wherein
before being contacted with the fluid comprising the target anionic entity at least about 40 wt % of the precipitated cationic rare earth of the porous substrate is in a +4 oxidation state, where the remainder of the precipitated cationic rare earth is in a +3 oxidation state,
the association of the target anionic entity with the precipitated cationic rare earth converts at least about 70 wt % of the precipitated cationic rare earth from the +4 oxidation state to the +3 oxidation state, and
the formation of the regenerated porous substrate converts at least about 80 wt % of the precipitated cationic rare earth from the +3 oxidation state to the +4 oxidation state.

41. The method of claim 1, wherein the porous substrate is a polymer.

42. The method of claim 41, wherein the polymer is selected from the group consisting of thermosetting polymers, thermoplastic polymers, elastomeric polymers, and cellulosic polymers.

43. The method of claim 14, wherein fluid comprising the target anionic entity is an aqueous fluid in which the target anionic entity is present in an amount in the range of from 10 ppm to 50 ppm.

44. The method of claim 43, wherein pH of the aqueous fluid is in a range of from about 5 to about 9.

45. The method of claim 1, wherein the treatment operation further comprises removing further target anionic entities from the fluid comprising the target anionic entity by contacting the regenerated porous substrate with the fluid comprising the target anionic entity.

* * * * *